US012786414B2

(12) United States Patent
Gao et al.

(10) Patent No.: US 12,786,414 B2
(45) Date of Patent: Nov. 3, 2026

(54) METHOD AND APPARATUS FOR MOTION INFORMATION STORAGE

(71) Applicant: HUAWEI TECHNOLOGIES CO., LTD., Shenzhen (CN)

(72) Inventors: Han Gao, Shenzhen (CN); Semih Esenlik, Munich (DE); Elena Alexandrovna Alshina, Munich (DE); Biao Wang, Shenzhen (CN); Anand Meher Kotra, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/795,684

(22) Filed: Aug. 6, 2024

(65) Prior Publication Data

US 2024/0406404 A1 Dec. 5, 2024

Related U.S. Application Data

(63) Continuation of application No. 17/681,066, filed on Feb. 25, 2022, now Pat. No. 12,081,765, which is a (Continued)

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/132* (2014.11); *H04N 19/176* (2014.11)

(58) Field of Classification Search
CPC .. H04N 19/105; H04N 19/109; H04N 19/119; H04N 19/132; H04N 19/137; H04N 19/70; H04N 19/176
See application file for complete search history.

(56) References Cited

U.S. PATENT DOCUMENTS 8,582,666 B2 11/2013 Zuo et al.
8,964,833 B2 2/2015 Auwera et al.
(Continued)

FOREIGN PATENT DOCUMENTS

CN 103141104 A 6/2013
CN 109862369 A 6/2019
(Continued)

OTHER PUBLICATIONS

"Low-Complexity Geometric Inter-Prediction for Versatile Video Coding"—Blaser et al.; 978-1-7281-4704-8/19/$31.00 © 2019 IEEE. (Year: 2019).*

(Continued)

*Primary Examiner* — Mainul Hasan
(74) *Attorney, Agent, or Firm* — WOMBLE BOND DICKINSON (US) LLP

(57) ABSTRACT

A motion information storing method comprises: determining a distance between a sample set in the current block and the common boundary; and comparing the distance with a threshold to determine whether third motion information is stored for the sample set, wherein the third motion information is derived by the first motion information and the second motion information.

17 Claims, 13 Drawing Sheets

10

Related U.S. Application Data continuation of application No. PCT/EP2019/072716, filed on Aug. 26, 2019.

(51) Int. Cl.
*H04N 19/132* (2014.01)
*H04N 19/176* (2014.01)

(56) References Cited

U.S. PATENT DOCUMENTS

| | | | | |
|---|---|---|---|---|
| 9,338,476 | B2 | 5/2016 | Van Der Auwera et al. | |
| 2011/0200109 | A1 | 8/2011 | Joshi et al. | |
| 2011/0200111 | A1 | 8/2011 | Chen | |
| 2016/0277762 | A1* | 9/2016 | Zhang | H04N 19/593 |
| 2018/0324437 | A1 | 11/2018 | Kim | |
| 2019/0191171 | A1 | 6/2019 | Ikai | |
| 2021/0051335 | A1* | 2/2021 | Liao | H04N 19/176 |
| 2021/0058617 | A1 | 2/2021 | Reuze | |
| 2021/0274218 | A1* | 9/2021 | Lin | H04N 19/70 |
| 2021/0321102 | A1 | 10/2021 | Chen | |
| 2022/0182607 | A1* | 6/2022 | Furht | H04N 19/136 |
| 2022/0272359 | A1 | 8/2022 | Liao | |

FOREIGN PATENT DOCUMENTS

| | | | | |
|---|---|---|---|---|
| CN | 109963155 | A | 7/2019 | |
| JP | 2012023597 | A | 2/2012 | |
| JP | 2018507622 | A | 3/2018 | |
| JP | 2018088691 | A | 6/2018 | |
| RU | 2017133106 | A | 4/2019 | |
| WO | 2010151334 | A1 | 12/2010 | |
| WO | 2014048372 | A1 | 4/2014 | |
| WO | 2018128239 | A1 | 7/2018 | |
| WO | 2018026219 | A1 | 2/2019 | |
| WO | WO-2020094073 | A1 * | 5/2020 | H04N 19/119 |
| WO | WO-2021030019 | A1 * | 2/2021 | H04N 19/119 |

OTHER PUBLICATIONS

"Geometry-Adaptive Block Partitioning for Video Coding"—Escoda et al., 1-4244-0728-1/07/$20.00 A © 2007 IEEE (Year: 2007).*

"Complexity Reduction and Performance Improvement for Geometry Partitioning in Video Coding"Wang et al., IEEE Transactions on Circuits and Systems for Video Technology, vol. 23, No. 2, Feb. 2013 (Year: 2013).*

Document: JVET-N1002-v2, Jianle Chen et al., Algorithm description for Versatile Video Coding and Test Model 5 (VTM 5), Joint Video Experts Team (JVET) of ITU-T SG 16 WP 3 and ISO/IEC JTC 1/SC 29/WG11, 14th Meeting: Geneva, CH, Mar. 19-27, 2019, total 76 pages.

Document: JCTVC-C502, WG11 No. ml8602, Edouard Francois (coordinator) et al, Core Experiment 2: Flexible Motion Partitioning, Joint Collaborative Team on Video Coding (JCT-VC) ofITU-T SG16 WP3 and 1S0/IEC JTC1/SC29/WG11, 3rd Meeting: Guangzhou, CN, Oct. 7-15, 2010, total 6 pages.

Document: JVET-J0023-r1, Max Blaser et al., Description of SDR and 360 video coding technology proposal by RWTH Aachen University, Joint Video Experts Team (JVET) of ITU-T SG 16 WP 3 and ISO/IEC JTC 1/SC 29/WG 11, 10th Meeting: San Diego, US, Apr. 10-20, 2018, total 102 pages.

Document: JVET-L0124-v2, Ru-Ling Liao et al., CEI0.3.1.b: Triangular prediction unit mode, Joint Video Exploration Team (JVET) of ITU-T SG 16 WP 3 and ISO/IECJTC 1/SC29/WG11, 12th Meeting: Macao, CN, Oct. 3-12, 2018, total 8 pages.

Semih Esenlik et al. Non-CE4: Geometrical partitioning for inter blocks [online] JVET-00489-v4, Internet URL: https://jvet-experts . org/doc_end_user/documents/15_Gothenburg/wg11/JVET-O0489-v4.zip>, Jul. 7, 2019.

S. Esenlik et al., Non-CE4: Geometrical partitioning for inter blocks, JVET-O0489 (JVET-N1001-v5), Version 4, Internet URL: https://jvet-experts.org/doc_end_user/documents/15_Gothenburg/wg1 1/JVET-O0489-v4.zip>, Jul. 7, 2019, p. 56 to 57, p. 111 to 113, p. 217 to 219, p. 2, p. 1 to 8, and p. 1 to 3.

"Geometry-Adaptive Motion Partitioning Using Improved Temporal Prediction"—Max Blaser, Cordula Heithausen and Mathias Wien; 978-1-5386-0462-5/17/$31.00 A © 2017 IEE (Year: 2017).

"Geometry-Adaptaive Block Partitioning for Video Coding"—Oscar Divorra Escoda, Peng Yin, Congxia Dai, Xin Li; 1-4244-0728-1/07/$20.00 A © 2007 IEEE (Year: 2007).

Semih Esenlik et al:"Non-CE4: Geometrical partitioning for inter blocks", Huawei Technologies Co., Ltd, RWTH Aachen University, oint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0489-v2, total 10 pages.

* cited by examiner

10

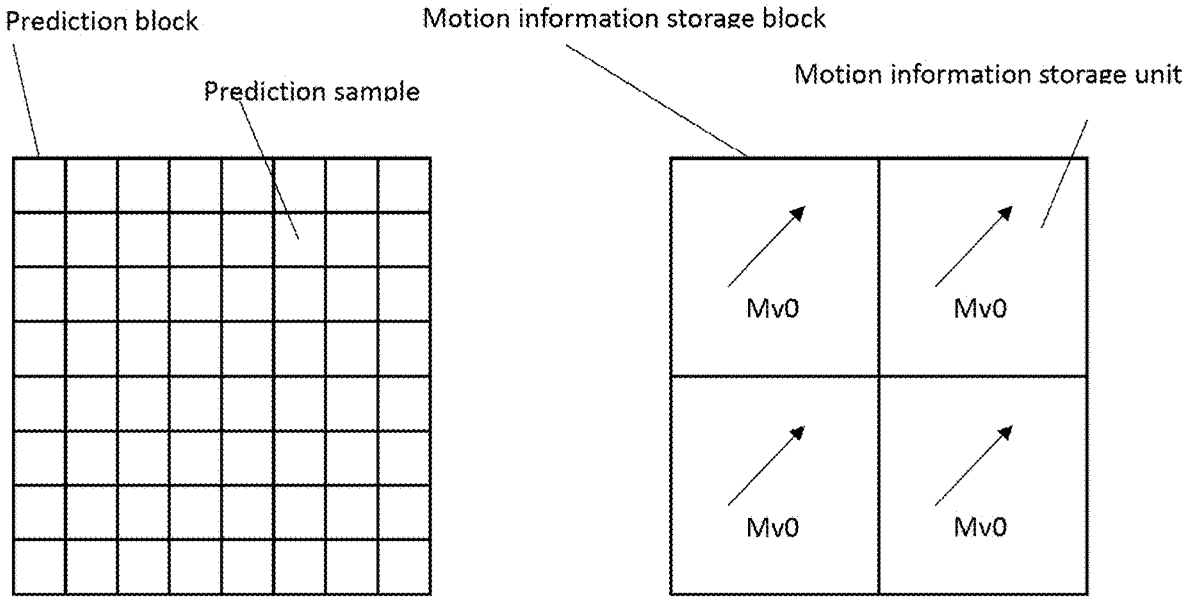
Fig. 9
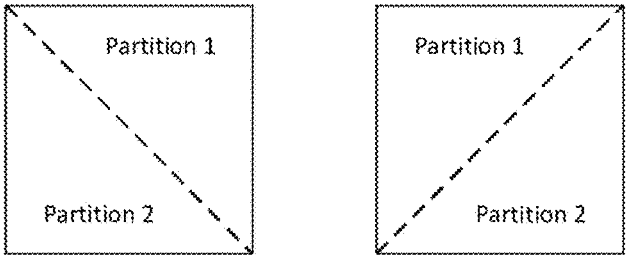
Fig. 10
| Merge index | L0 MV | L1 MV |
|---|---|---|
| 0 | × | |
| 1 | | × |
| 2 | × | |
| 3 | | × |
| 4 | × | |
Fig. 11

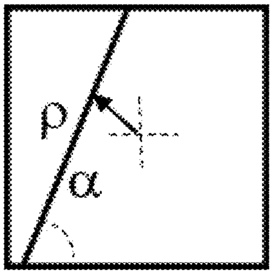
Fig.15
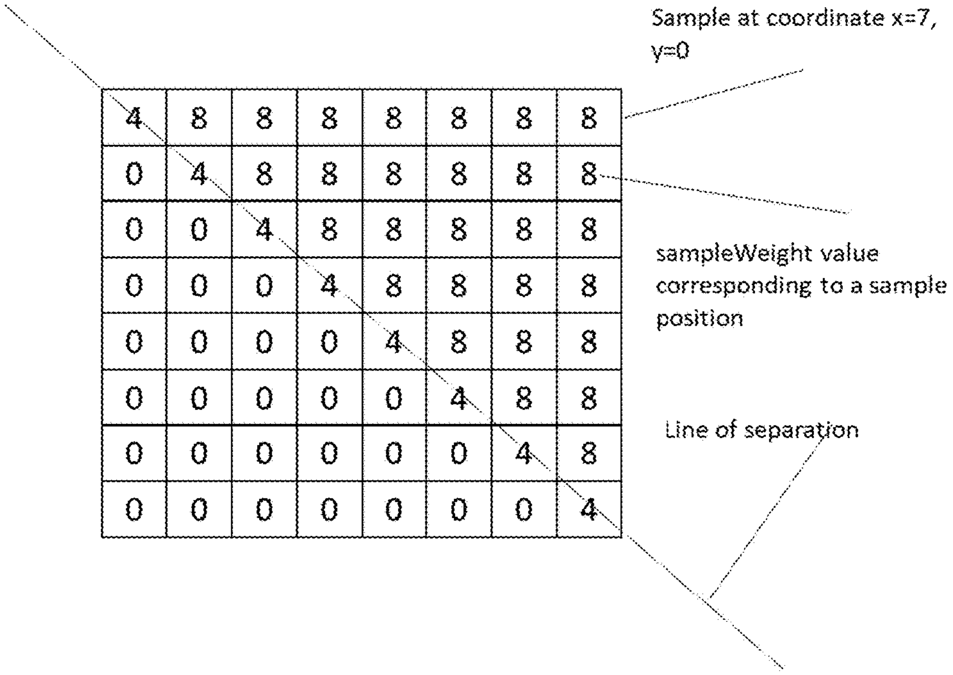
Fig.16
| idx | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| GeoFilter[idx] | 4 | 4 | 5 | 5 | 5 | 5 | 6 | 6 | 6 | 6 | 7 | 7 | 7 | 7 | 8 |
Fig. 17

METHOD AND APPARATUS FOR MOTION INFORMATION STORAGE

CROSS-REFERENCE TO RELATED APPLICATIONS

This application is a continuation of U.S. patent application Ser. No. 17/681,066, filed on Feb. 25, 2022, which is a continuation of International Application No. PCT/EP2019/072716, filed on Aug. 26, 2019. All of the afore-mentioned patent applications are hereby incorporated by reference in their entireties.

TECHNICAL FIELD

Embodiments of the present application generally relate to the field of video coding and more particularly to inter prediction.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

According to a first aspect of the present application, a motion information storing method is disclosed, a current block consists of a first subblock and a second subblock, the first subblock and the second subblock are separated by a common boundary, the first subblock corresponds to first motion information and the second subblock corresponds to second motion information, the method comprising: determining a distance between a sample set in the current block and the common boundary; and comparing the distance with a threshold to determine whether third motion information is stored for the sample set, wherein the third motion information is derived by the first motion information and the second motion information.

In an embodiment, comparing the distance with a threshold to determine whether the third motion information is stored for the sample set, comprising: determining the third motion information is stored for the sample set in the event that an absolute value of the distance is smaller than or equal to the threshold.

In an embodiment, in the event that the absolute value of the distance is larger than the threshold, the method further comprising: determining the first motion information is stored for the sample set in the event that the distance is positive; or, determining the second motion information is stored for the sample set in the event that the distance is negative.

In an embodiment, the threshold is predetermined.

In an embodiment, the threshold is based on a geometric relationship between the common boundary and a horizontal direction or a vertical direction.

In an embodiment, the threshold is based on an angle between a perpendicular direction of the common boundary and the horizontal direction or the vertical direction.

In an embodiment, the threshold is based on a width and/or a height of the current block.

In an embodiment, the common boundary is determined by an angular parameter and a distance parameter, before determining the distance between the sample set in the current block and the common boundary, the method further comprising: determining the angular parameter and the distance parameter.

In an embodiment, in a decoder, determining the angular parameter and the distance parameter, comprising: parsing the angular parameter and the distance parameter from a bitstream; or, parsing an indicator from the bitstream, and obtaining the angular parameter and the distance parameter based on the indicator.

In an embodiment, after determining the angular parameter and the distance parameter, the method further comprising: determining a first calculation parameter based on the angular parameter; calculating a temp angular parameter based on the angular parameter; determining a second calculation parameter based on the temp angular parameter; and calculating a third calculation parameter based on the angular parameter and the distance parameter.

In an embodiment, the first calculation parameter is determined by checking a preset lookup table according to the angular parameter and the second calculation parameter is determined by checking the lookup table according to the temp angular parameter, and wherein the first calculation parameter and the second calculation parameter are a cosine value and a sine value of a same angle respectively.

In an embodiment, the distance is calculated by the following:

$$distFromLine=(x+K)*P1+(y+K)*P2-P3$$

wherein P1, P2 and P3 are the first calculation parameter, the second calculation parameter and the third calculation parameter respectively, distFromLine represents the distance, K is a non-negative integer, x represents a horizontal coordinate of a target position in the sample set, y represents a vertical coordinate of the target position in a rectangular coordinate system, where a position of the top-left sample of the current block is set as a coordinate origin, right direction is set as the positive horizontal direction and down direction is set as the positive vertical direction.

In an embodiment, K equals to 1.

In an embodiment, the target position is predetermined in the sample set.

In an embodiment, the predetermined position is a top-left position of the sample set, or a center position of the sample set.

In an embodiment, the sample precision of the distance is higher than the integer sample; correspondingly, the distance is calculated by the following:

$$distFromLine = ((x << N) + K) * P1 + ((y << N) + K) * P2 - P3$$

where 2N represents a reciprocal of the sample precision of the distance.

In an embodiment, N equals to 1.

In an embodiment, the sample set is a luma sample set of the current block.

In an embodiment, before determining the distance between the sample set in the current block and the common boundary, the method further comprising: splitting the current block into multiple sample sets, wherein each of the multiple sample sets has a same size as the sample set; or setting the current block as the sample set.

In an embodiment, the sample set is a 4×4 sample array.

In an embodiment, each of the multiple sample sets corresponds to each motion information storage unit, the motion information storage unit is used to store one of the first motion information, the second motion information and the third motion information.

In an embodiment, the first subblock and the second subblock are triangle partition, trapezoid partition, or asymmetric rectangular partition.

In an embodiment, the first motion information comprises motion information based on a first reference picture list, the second motion information comprises motion information based on a second reference picture list, and wherein the third motion information comprises the first motion information and the second motion information.

According to a second aspect of the present application, an apparatus for decoding a video stream includes a processor and a memory is disclosed. The memory is storing instructions that cause the processor to perform the method according to the first aspect.

According to a third aspect of the present application, an apparatus for encoding a video stream includes a processor and a memory is disclosed. The memory is storing instructions that cause the processor to perform the method according to the first aspect.

According to a fourth aspect, a computer-readable storage medium having stored thereon instructions that when executed cause one or more processors configured to code video data is proposed. The instructions cause the one or more processors to perform a method according to the first aspect.

According to a fifth aspect, a computer program comprising program code for performing the method according to the first aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the application are described in more detail with reference to the attached figures and drawings, in which:

FIG. 9 is a diagram showing an example of the motion vector storage for a prediction block of size 8×8 luma samples;

FIG. 10 is a diagram showing an example of triangle partition based inter prediction;

FIG. 11 is a diagram showing an example of uni-prediction MV selection for triangle partition mode;

FIG. 15 is a diagram showing an example of GEO partitioning parameters;

FIG. 16 is a diagram showing an example of blending operation;

FIG. 17 is a diagram showing an example of a lookup table for blending operation;

Figure 1A:
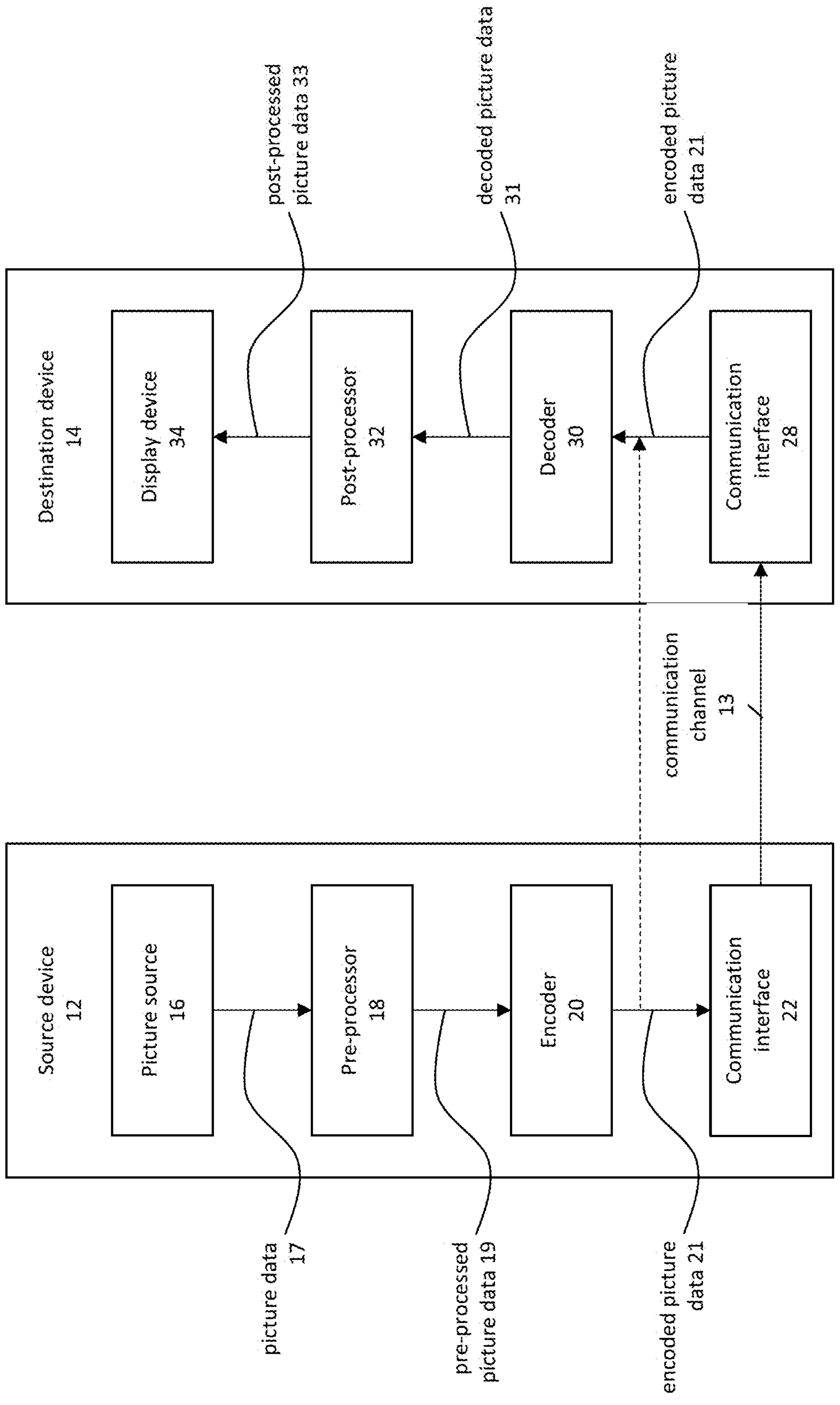
FIG. 1A is a block diagram showing an example of a video coding system configured to implement embodiments of the application.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the application or specific aspects in which embodiments of the present application may be used. It is understood that embodiments of the application may be used in other aspects and comprise structural or logical changes not depicted in the figures. The following detailed description, therefore, is not to be taken in a limiting sense, and the scope of the present application is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra-and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2).

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
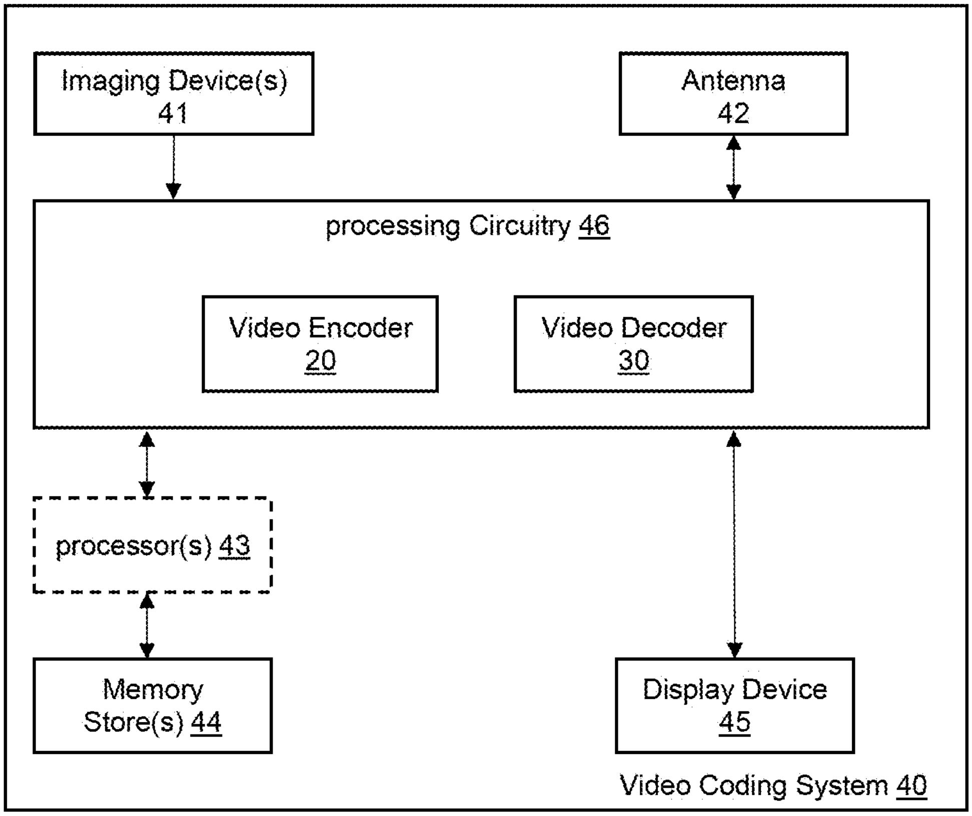
FIG. 1B is a block diagram showing another example of a video coding system configured to implement embodiments of the application.

The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the application are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the application are not limited to HEVC or VVC.

Encoder and Encoding Method

Figure 2:
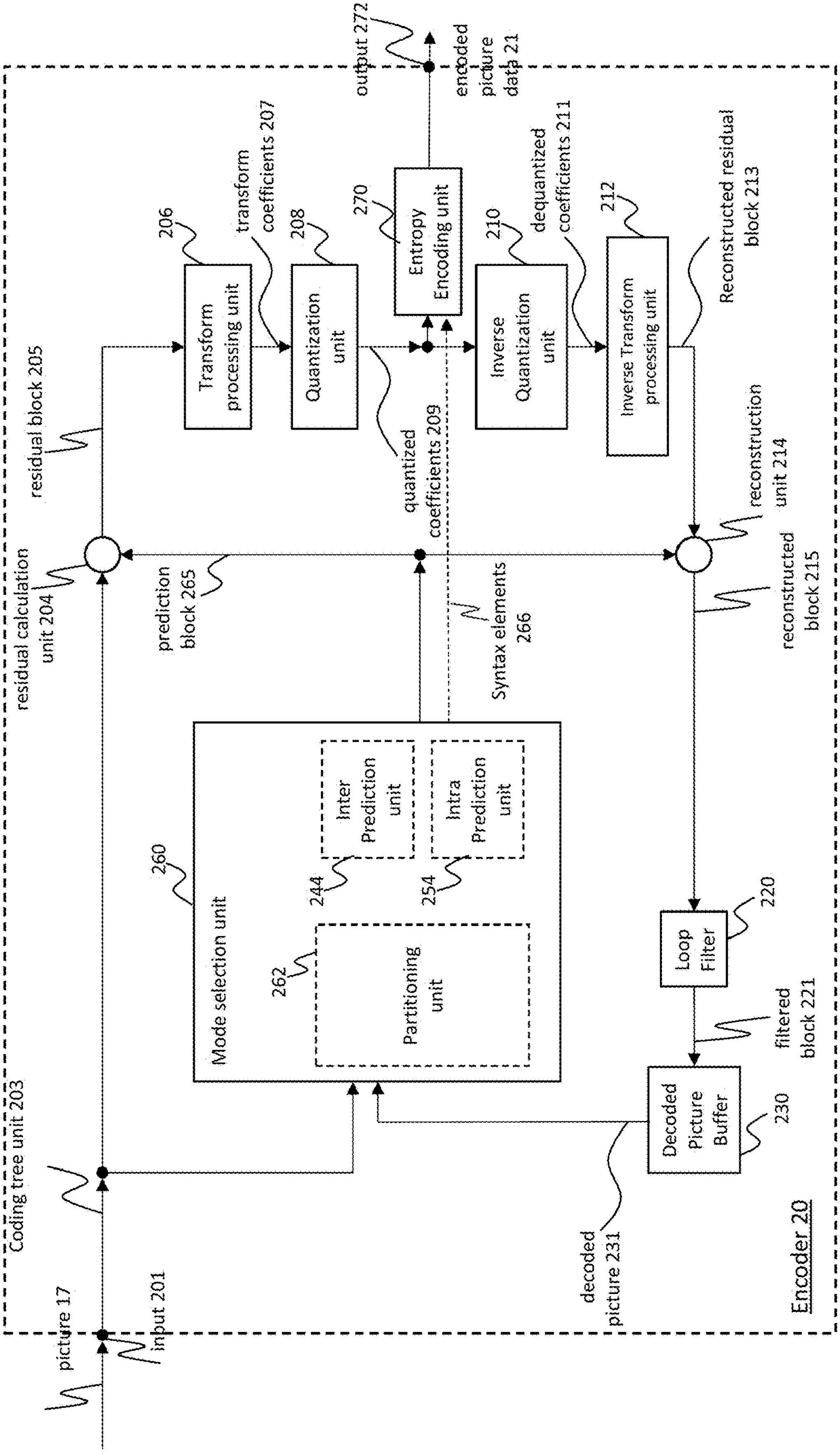
FIG. 2 is a block diagram showing an example of a video encoder configured to implement embodiments of the application.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
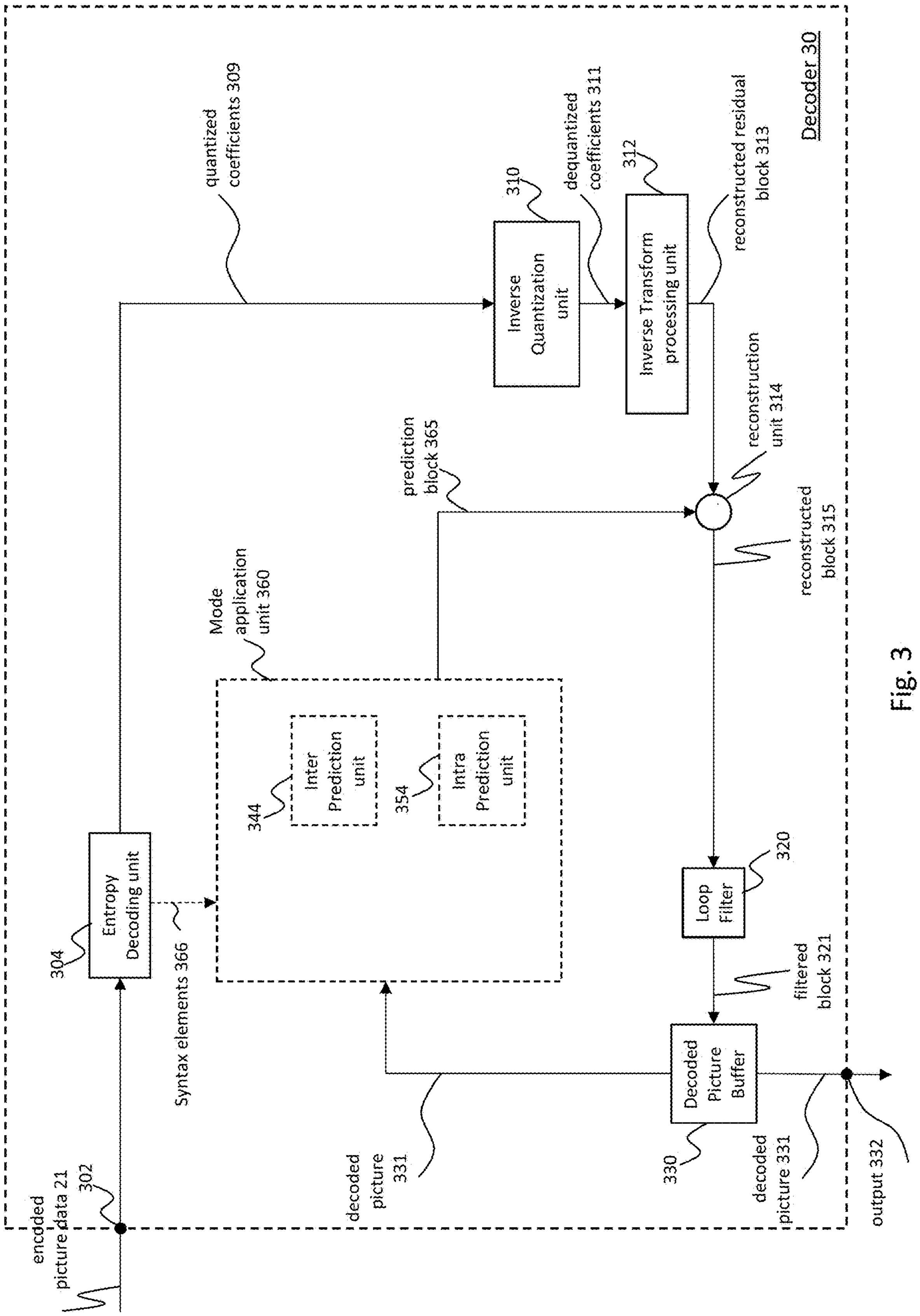
FIG. 3 is a block diagram showing an example structure of a video decoder configured to implement embodiments of the application.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video encoder 20 as shown in FIG. 2 may be further configured to partition and/or encode the picture by using slices/tile groups (also referred to as video tile groups) and/or tiles (also referred to as video tiles), wherein a picture may be partitioned into or encoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding-sample by sample-the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered sample values. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as SAO filter parameters or ALF filter parameters or LMCS parameters), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition a picture from a video sequence into a sequence of coding tree units (CTUs), and the CTU 203 may be further partitioned into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may be configured to partition a picture from a video sequence into a sequence of coding tree units (CTUs), and the partitioning unit 262 may partition (or split) a coding tree unit (CTU) 203 into smaller partitions, e.g. smaller blocks of square or rectangular size. For a picture that has three sample arrays, a CTU consists of an N×N block of luma samples together with two corresponding blocks of chroma samples. The maximum allowed size of the luma block in a CTU is specified to be 128×128 in the developing versatile video coding (VVC), but it can be specified to be value rather than 128×128 in the future, for example, 256×256. The CTUs of a picture may be clustered/grouped as slices/tile groups, tiles or bricks. A tile covers a rectangular region of a picture, and a tile can be divided into one or more bricks. A brick consists of a number of CTU rows within a tile. A tile that is not partitioned into multiple bricks can be referred to as a brick. However, a brick is a true subset of a tile and is not referred to as a tile. There are two modes of tile groups are supported in VVC, namely the raster-scan slice/tile group mode and the rectangular slice mode. In the raster-scan tile group mode, a slice/tile group contains a sequence of tiles in tile raster scan of a picture. In the rectangular slice mode, a slice contains a number of bricks of a picture that collectively form a rectangular region of the picture. The bricks within a rectangular slice are in the order of brick raster scan of the slice. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quadtree structure similar to the coding tree for the CU.

Figure 6:
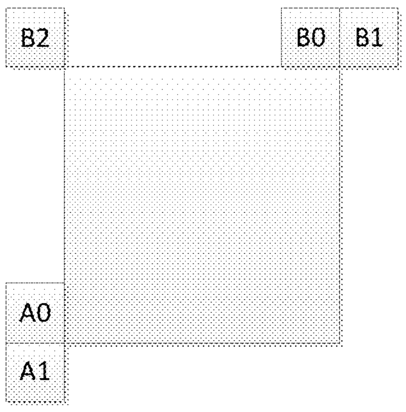
FIG. 6 is a diagram showing an example of positions of spatial merge candidate.

In embodiments, e.g., according to the latest video coding standard currently in development, which is referred to as Versatile Video Coding (VVC), a combined Quad-tree nested multi-type tree using binary and ternary splits segmentation structure, for example used to partition a coding tree unit. In the coding tree structure within a coding tree unit, a CU can have either a square or rectangular shape. For example, the coding tree unit (CTU) is first partitioned by a quaternary tree. Then the quaternary tree leaf nodes can be further partitioned by a multi-type tree structure. There are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU.VVC develops a unique signaling mechanism of the partition splitting information in quadtree with nested multi-type tree coding tree structure. In the signalling smechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt_split_cu_vertical_flag) is signalled to indicate the splitting direction, and then a third flag (mtt_split_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units s (VPDUs) which are defined as non-overlapping units in a picture. In hardware decoders, successive VPDUs are processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size. In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

In one example, the mode selection unit 260 of video encoder 20 may be configured to perform any combination of the partitioning techniques described herein.

As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode may be applied.

The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g. a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding,. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g.

encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214, the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. an adaptive loop filter (ALF), a noise suppression filter (NSF), or any combination thereof. In an example, the loop filter unit 220 may comprise a de-blocking filter, a SAO filter and an ALF filter. The order of the filtering process may be the deblocking filter, SAO and ALF. In another example, a process called the luma mapping with chroma scaling (LMCS) (namely, the adaptive in-loop reshaper) is added. This process is performed before deblocking. In another example, the deblocking filter process may be also applied to internal sub-block edges, e.g. affine sub-blocks edges, ATMVP sub-blocks edges, sub-block transform (SBT) edges and intra sub-partition (ISP) edges. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs) or one or more groups of blocks (e.g. tiles (H.265/HEVC and VVC) or bricks (VVC)).

Embodiments of the video decoder 30 as shown in FIG. 3 may be configured to partition and/or decode the picture by using slices/tile groups (also referred to as video tile groups) and/or tiles (also referred to as video tiles), wherein a picture may be partitioned into or decoded using one or more slices/tile groups (typically non-overlapping), and each slice/tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation may be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is −2^(bitDepth-1)~2^(bitDepth-1)-1, where "^" means exponentiation. For example, if bitDepth is set equal to 16, the range is −32768~32767; if bitDepth is set equal to 18, the range is −131072~131071. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Figure 4:
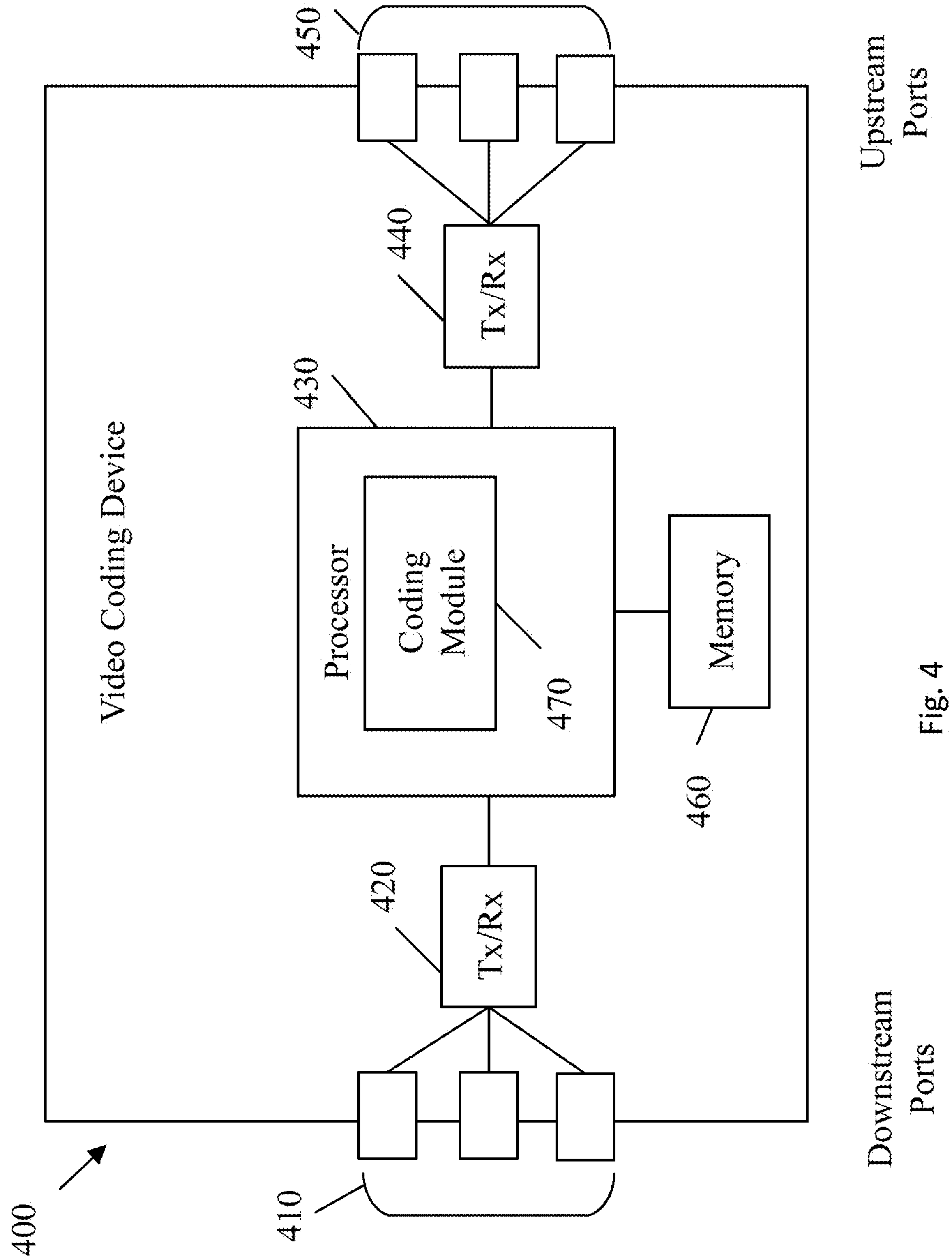
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
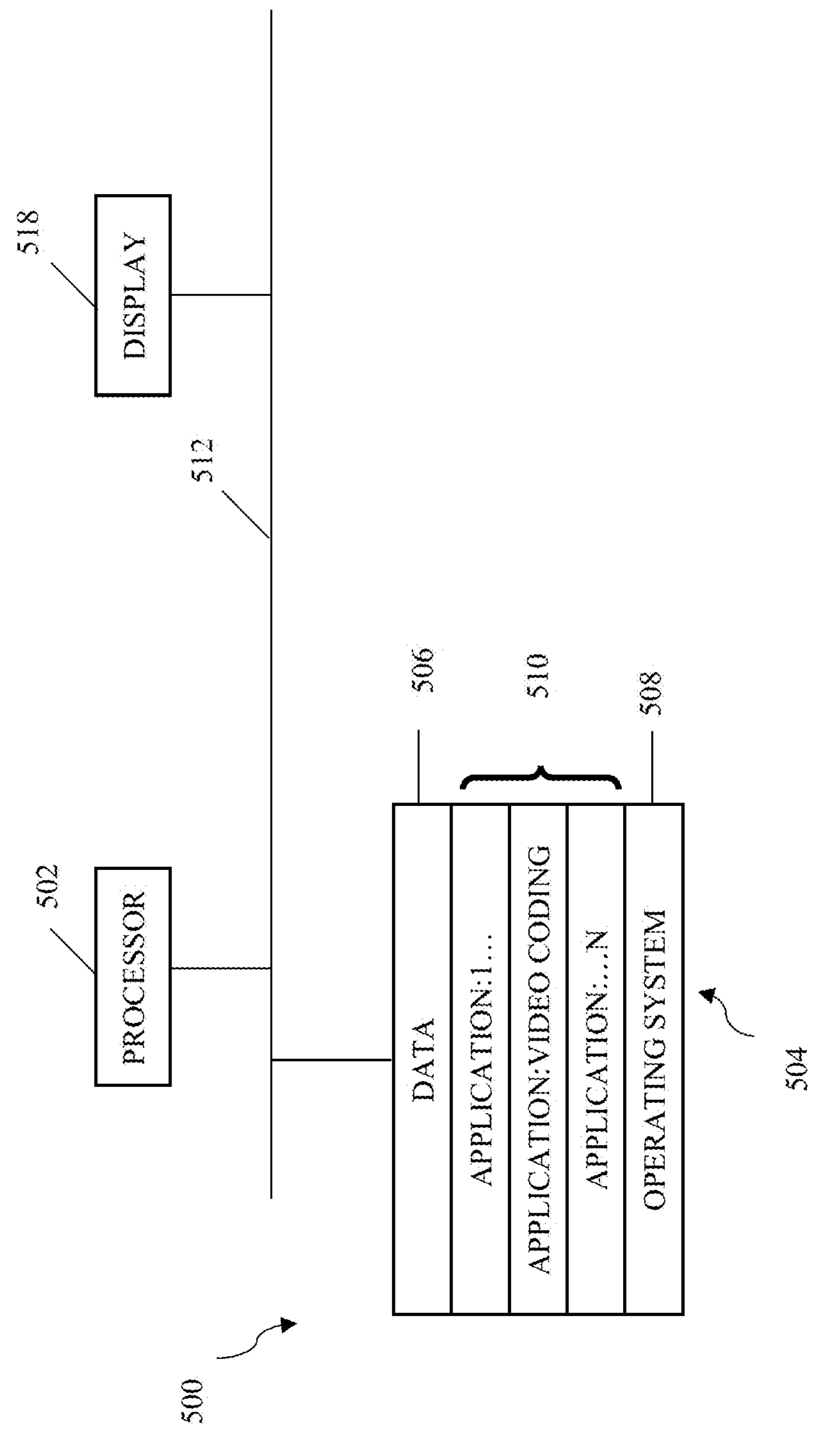
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Some related examples are following, and it is noted that a JVET meeting document JVET-N1002 is used as a reference.

I. Merge Prediction

The merge candidate list is constructed by including the following five types of candidates in order:

| | |
|---|---|
| 1) | Spatial MVP from spatial neighbour CUs |
| 2) | Temporal MVP from collocated CUs |
| 3) | History-based MVP from an FIFO table |
| 4) | Pairwise average MVP |
| 5) | Zero MVs. |

The size of merge list is signalled in slice header and the maximum allowed size of merge list is an integer number, for example the number might be 6. For each CU code in merge mode, an index of best merge candidate is encoded. The generation process of each category of merge candidates is provided in this session.

(1) Spatial Candidates Derivation

Figure 7:
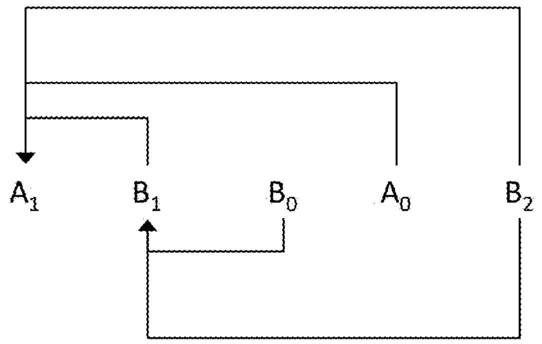
FIG. 7 is a diagram showing an example of candidate pairs considered for redundancy check of spatial merge candidates.

As an example, a maximum of four merge candidates are selected among candidates located in the positions depicted in FIG. 6. The order of derivation is A0, B0, B1, A1 and B2. Position B2 is considered only when any CU of position A0, B0, B1, A1 is not available (e.g. because it belongs to another slice or tile) or is intra coded. After candidate at position A1 is added, the addition of the remaining candidates is subject to a redundancy check which ensures that candidates with same motion information are excluded from the list. In an embodiment, only the pairs linked with an arrow in FIG. 7 are considered and a candidate is only added to the list if the corresponding candidate used for redundancy check has not the same motion information.

(2) Temporal Candidates Derivation

Figure 8:
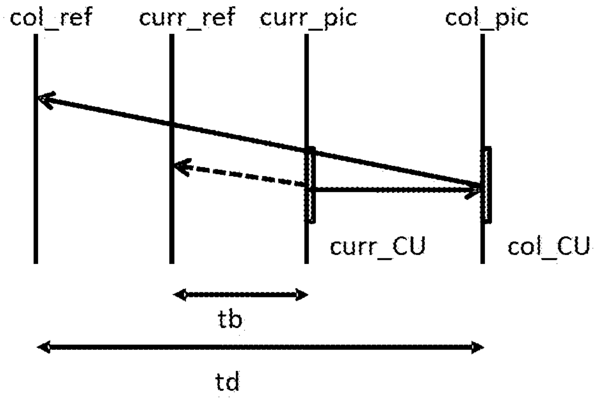
FIG. 8 is a diagram showing an example of the motion vector scaling for temporal merge candidate.

As an example, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signalled in the slice header. The scaled motion vector for temporal merge candidate is obtained as illustrated by the dotted line in FIG. 8, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

It is noted that POC (Picture Order Count) means a variable that is associated with each picture, uniquely identifies the associated picture among all pictures in the CVS (Coded Video Sequence), and, when the associated picture is to be output from the decoded picture buffer, indicates the position of the associated picture in output order relative to the output order positions of the other pictures in the same CVS that are to be output from the decoded picture buffer.

(3) History-Based Merge Candidates Derivation

The history-based MVP (HMVP) merge candidates are added to merge list after the spatial MVP and TMVP. The motion information of a previously coded block is stored in a table and used as MVP for the current CU. The table with multiple HMVP candidates is maintained during the encoding/decoding process. The table is reset when a new CTU row is encountered. Whenever there is a non-subblock inter-coded CU, the associated motion information is added to the last entry of the table as a new HMVP candidate. The latest several HMVP candidates in the table are checked in order and inserted to the candidate list after the TMVP candidate. Redundancy check is applied on the HMVP candidates to the spatial or temporal merge candidate.

(4) Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

(5) When the merge list is not full after pair-wise average merge candidates are added, the zero MVPs are inserted in the end until the maximum merge candidate number is encountered.

II. Bi-Prediction

Inter-picture prediction makes use of the temporal correlation between pictures in order to derive a motion-compensated prediction (MCP) for a block of image samples. For each block, a corresponding block in a previously decoded picture can be found that serves as a predictor. The position of the block in a previously decoded picture is indicated by a motion vector (Δx, Δy) where Δx specifies the horizontal and Δy specifies the vertical displacement relative to the position of the current block. The motion vectors (Δx, Δy) could be of fractional sample accuracy to more accurately capture the movement of the underlying object. Interpolation is applied on the reference pictures to derive the prediction signal when the corresponding motion vector has fractional sample accuracy. The previously decoded picture is referred to as the reference picture and indicated by a reference index Δt to a reference picture list.

In case of bi-prediction (comparing to uni-prediction that uses one set of motion data), two sets of motion data (Δx0, Δy0, Δt0 and Δx1, Δy1, Δt1) are used to generate two MCPs (might be from different pictures, or the same picture), which are then combined to get the final MCP. Generally, it is derived by averaging. In case of weighted prediction, different weights can be applied to each MCP. The reference pictures that can be used in bi-prediction are stored in two separate lists, namely list 0 and list 1.

III. Motion Information Storage

After motion compensation has been performed, the (uni-prediction or bi-prediction) motion information associated with the prediction block is stored in a memory. The stored motion information is used as the reference information of a future block (CU/PU), such as through spatial or temporal motion vector prediction.

In some examples, the motion information storage is performed by using a two-dimension array of motion information sub-blocks or motion information storage units. The spatial resolution of the two-dimensional array may be different from a spatial resolution of the to-be-coded image. In an example, a lower resolution of the motion information storage unit is used to save the memory space. For example, 16×16 luma samples corresponds to a single motion information storage unit, which means each sample in the 16×16 luma samples has same motion information and the same motion information is stored in the single motion information storage unit that corresponds to this 16×16 luma samples. In other words, the motion information storage unit contains inter-picture prediction information of an associated prediction block, which consists of 16×16 luma samples.

And it is noted that 16×16 luma samples means a set of luma samples which is a two-dimensional sample array, and both the width and the height of the two-dimensional sample array is 16. A single motion information storage unit might also correspond to 8×8 luma samples, 4×4 luma samples or other N×M luma samples or chroma samples, N and M are positive integers. And it is understandable that smaller size of motion information storage unit allows better motion vector prediction, but costs more memory space. The motion vector storage for a prediction block of size 8×8 luma samples is exemplified in FIG. 9. The motion information of the prediction block, labeled Mv0, is stored in each 2×2 motion vector storage unit.

III. Triangle Partition for Inter Prediction

As an example, the triangle partition mode is only applied to CUs that are 8×8 or larger and are coded in skip or merge mode. ACU-level flag is signalled to indicate whether the triangle partition mode is applied or not.

A CU in triangle partition mode is split evenly into two triangle-shaped partitions, using either the diagonal split or the anti-diagonal split (FIG. 10). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly the merge candidate list constructed for merge prediction mentioned above, and the selection of a uni-prediction motion from a given merge candidate in the list is according to the procedure "uni-prediction candidate list construction". After predicting each of the triangle partitions, the sample values along the diagonal or anti-diagonal edge are adjusted using a blending processing with adaptive weights. Finally, the motion field of a CU predicted using the triangle partition mode is stored.

(1) Uni-Prediction Candidate List Construction

Given a merge candidate index, the uni-prediction motion vector is derived from the merge candidate list constructed for merge prediction mentioned above, as an example in FIG. 11. For a candidate in the list, its LX motion vector with X equal to the parity of the merge candidate index value, is used as the uni-prediction motion vector for triangle partition mode. These motion vectors are marked with "x" in FIG. 11. In case a corresponding LX motion vector does not exist, the L(1-X) motion vector of the same candidate in the merge prediction candidate list is used as the uni-prediction motion vector for triangle partition mode.

(2) Blending Along the Triangle Partition Edge

Figure 12:
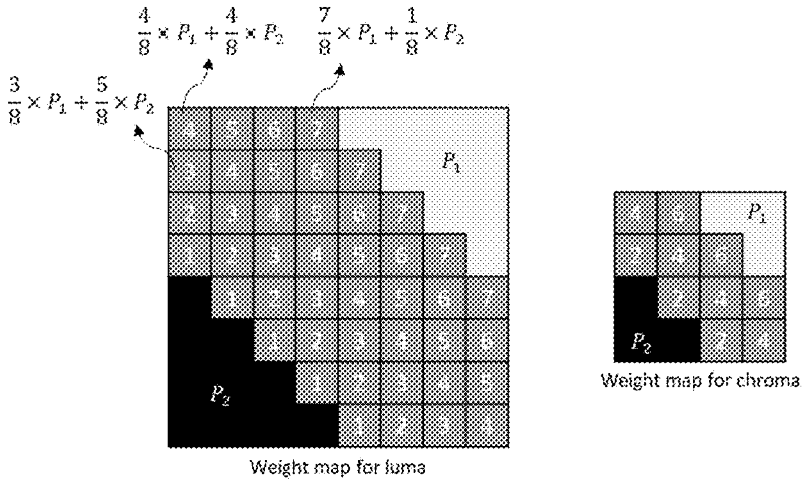
FIG. 12 is a diagram showing an example of weights used in the blending process.

After predicting each triangle partition using its own motion, blending is applied to the two prediction signals to derive samples around the diagonal or anti-diagonal edge. The following weights are used in the blending process: {7/8, 6/8, 5/8, 4/8, 3/8, 2/8, 1/8} for luma and {6/8, 4/8, 2/8} for chroma, as shown in FIG. 12.

(3) Motion Field Storage

As an example, the motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 12, either Mv1 or Mv2 is stored for that 4×4 unit. Otherwise (if the 4×4 unit is located in the weighted area), a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, and without loss of generality, assume they are both from L0. In this case:

If the reference picture of either Mv2 (or Mv1) appears in L1, then that Mv2 (or Mv1) is converted to a L1 motion vector using that reference picture in L1. Then the two motion vectors are combined to form the bi-prediction motion vector;

Otherwise, instead of bi-prediction motion, only uni-prediction motion Mv1 is stored.

Figure 13:
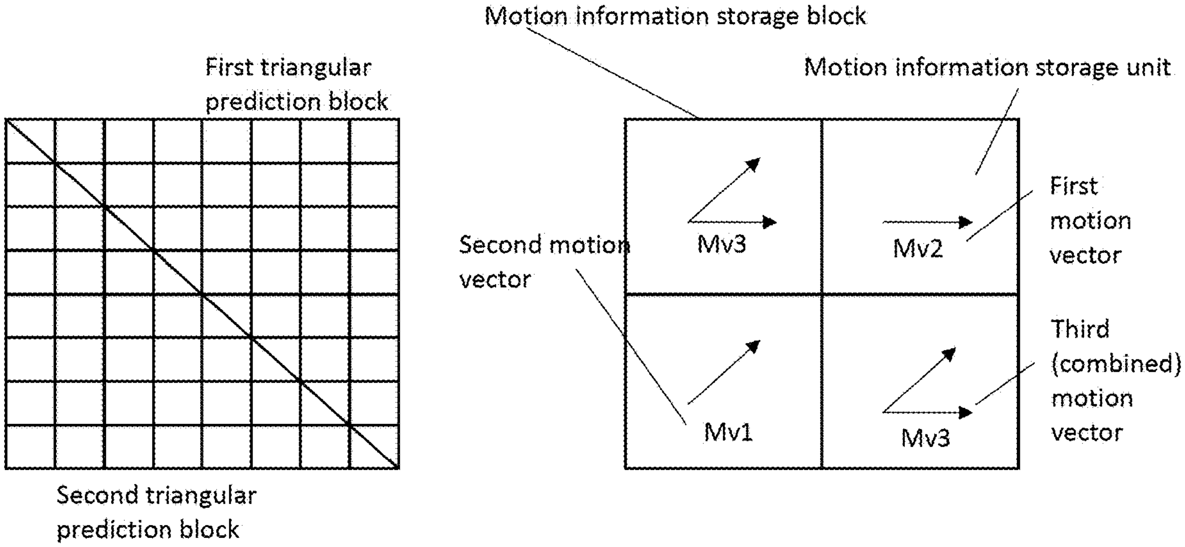
FIG. 13 is a diagram showing an example of the motion vector storage for a triangular partition mode.

As another example, the motion vector storage for a triangular partition mode is exemplified in FIG. 13.

IV. Geometrical Partitioning for Inter Blocks

Figure 14:
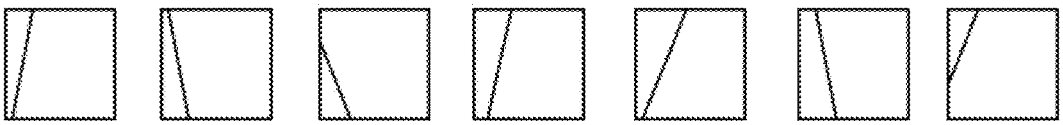
FIG. 14 is a diagram showing an example of different Geometrical partition.

For the triangular partition mode, two subblocks are split by a separation line, and the direction of the separation line is 45 degree or 135 degree. Other partition angles and partition proportions are also possible, which are called as GEO (Geometrical partitioning) mode in the present application, for example, as shown in FIG. 14.

In an example, overall number of GEO partitioning might be 140. This number found to be optimal from a balance between flexibility and bit cost. Additional signalling for GEO requires signalling for the angle α, and separation line displacement relatively to the center of the block ρ. α represents a quantized angle between 0 and 360 degrees, with 11.25 degrees of separation and ρ represents a distance with 5 different values. The meaning of α and ρ are exemplified in FIG. 15.

It is understandable that in the video coding technical field, generally, a prediction process performed in the encoder side and performed in the decoder side are similar, except that the side information is parsed from a bitstream in the decoder side, while the side information is determined by a pre-set rule, like rate-distortion optimization (RDO) method. As an example, the following operations are applied to obtain prediction samples in the GEO mode in a decoder side:

Operation S101: Determining a partition proportion for a current block.

An element syntax geo_partition_idx is parsed from a bitstream, which is used as an index to the lookup table that stores α and ρ pairs. In an example, α and ρ are represented by an angle index and a distance index respectively.

Operation S102: Obtain a first prediction mode for a first subblock and a second prediction mode for a second subblock.

Generally, same merge list derivation process that is used for triangle partition mode is used for deriving motion vectors of each partition (subblock) of the GEO block. Each partition is predicted only by uni-prediction. Two element syntax geo_merge_idx0 and geo_merge_idx1 are parsed from the bitstream to indicate the prediction modes of the two subblocks respectively.

In an example, the first prediction mode is not identical to the second prediction mode. In an example, a prediction mode (first prediction mode or second prediction mode) may be an inter prediction mode, information for an inter prediction mode may comprises a reference picture index and a motion vector. In another example, the prediction mode may be an intra-prediction mode, information for an intra the prediction mode may comprises an intra prediction mode index.

Operation S103: Generate a first prediction value for the first subblock and a second prediction value for the second subblock, using the first prediction mode and second prediction mode, respectively.

Operation S104: Obtain the combined values of prediction samples according to the combination of the first prediction value and the second prediction value, according to the division which is disclosed in operation S101.

As an example, more specifically, the operation S104 comprises:

Operation S104-1: For a luma sample in the current block, a sample distance (sample_dist) is calculated, the sample distance represents a distance of the luma sample to the separation line of the current block determined in operation S101.

In an example, a sample distance sample_dist is calculated according to the formula:

$$\text{sample\_dist} = ((x << 1) + 1) * Dis[angleIdx1] + ((y << 1) + 1)) * Dis[angleIdx2] - \text{offset}(distanceIdx).$$

angleIdx1 and angleIdx2 are obtained from the bitstream or derived based on other information obtained from the bistream, for example, derived based on the element syntax geo_partition_idx, as the angle index in operation S101; angleIdx1 and angleIdx2 represent quantized trigonometric parameters of the separation line.

x and y are the horizontal and vertical distances of a sample with respect to top-left sample of the current block.

offset (distanceIdx) is a function of an index value (distanceIdx), the index value is obtained from the bistream or derived based on other information obtained from the bistream, for example, derived based on the element syntax geo_partition_idx, as the distance index in operation S101.

Dis[ ] is a predefined lookup table.

In another example, the sample_dist and sampleWeight1 can be obtained according to the following equations:

$$nCbR = (W > H)\ ?\ (W/H) : (H/W)$$

$$\text{sample\_dist} = (W > H)\ ?\ (\text{Clip}\,3(0, 8, (x/nCbR - y) + 4)) : (\text{Clip}\,3(0, 8, (x - y/nCbR + 4)),$$

or $$\text{sample\_dist} = (W > H)\ ?\ (\text{Clip}\,3(0, 8, (H - 1 - x/nCbR - y) + 4)) : (\text{Clip}\,3(0, 8, (W - 1 - x - y/nCbR) + 4)).$$

where W is a width of the current block, H is a height of the current block.

It is noted that the above 2 examples show two methods of calculation according to integer arithmetic. Embodiments of the disclosure is not limited to those examples of calculation of the sample_dist.

In an examples, sample_dist can be a perpendicular line distance between a sample located on (x, y) and the separation line. In another example, making a horizontal line or a vertical line through a sample located on (x, y). The horizontal line or the vertical line will have an intersection point with the separation line. sample_dist can be a distance between the sample located on (x, y) and the intersection point.

Operation S104-2: A blending operation is implemented as a function with sample_dist as input, and sampleWeight1 or sampleWeight2 as output.

The sample_dist is used to calculate weighting factors, the weighting factors are used for a combination prediction value which is derived by combining the first prediction value and the second prediction value corresponding to the first subblock and the second subblock respectively. In an example, the weighting factors are denoted as sampleWeight1 and sampleWeight2, referring to weight values corresponding to the first prediction value and the second prediction value respectively. In an example, sampleWeight1 is calculated according to the sample_dist, sampleWeight2 is calculated according to the formula $$sampleWeight2 = T - sampleWeight1,$$

where T is a predefined constant. In one example, the predefined constant T is equal to 8, which means that the sampleWeight1 and sampleWeight2 can have values in a value range between 0 and 8 (inclusive 0 and 8). In another example, the predefined constant T is equal to 16.

According to one example, a first weighting factor sampleWeight1 is obtained according to sample_dist and a lookup table. In an example, the lookup table is used to store filter coefficients. In other words, the blending operation is implemented according to a lookup table. In such an example, a function of sample_dist can be used as an index value for the lookup table. The said function can be a division or multiplication with a constant number operation, a right shifting a constant amount operation, a taking the absolute value or a clipping operation or a combination of those.

The blending operation is applied to a sample according to a value of an indication in a bitstream, or a sample according to a value of an indication in a bitstream.

In an example, $$sampleWeight1 = \mathrm{Clip3}(0, 8, f(\mathrm{sample\_dist})).$$

The function f( ) can be a division/addition/multiplication with a constant number operation, a right shifting with a constant amount operation, taking the absolute value operation or a clipping operation or a combination of those.

In an example, sampleWeight1 (or sampleWeight2)= Clip3(0, 8, sample_dist),

In an example, $$sampleWeight1 \text{ (or } sampleWeight2) = \mathrm{Clip3}(0, 8, \mathrm{sample\_dist} + 4);$$

In an example, $$sampleWeight1 \text{ (or } sampleWeight2) = \mathrm{sample\_dist} == 4\,?\,4: \mathrm{sample\_dist} < 4\,?\,0: 8;$$

In an example, $$sampleWeight1 \text{ (or } sampleWeight2) = \mathrm{Clip3}(0, 8, \mathrm{sample\_dist} - 4) * K + \mathrm{sample\_dist});$$

In an example, $$sampleWeight1 \text{ (or } sampleWeight2) = \mathrm{sample\_dist} == 0\,?\,4: \mathrm{sample\_dist} < 0\,?\,0: 8;$$

In an example, $$sampleWeight1 \text{ (or } sampleWeight2) = \mathrm{Clip3}(0, 8, \mathrm{sample\_dist} * K + \mathrm{Clip3}(0, 8, \mathrm{sample\_dist} + 4)),$$

K is an integer with a value greater than 0. It is noted that the blending operation becomes shorter (hence sharper) with increasing K. For example, when K=4, then the second blending operation becomes identical to—

$$\text{“}sampleWeight = \mathrm{sample\_dist} == 0\,?\,4: \mathrm{sample\_dist} < 0\,?\,0: 8\text{”},$$

which was exemplified in FIG. 16. According to one example, a value of an indicator in a bitstream indicates a value of K.

In an example, the blending operation can be implemented as lookup table, such as the tables exemplified in FIG. 17. In an example, the sampleWeight can be obtained as geoFilter[idx] where idx is obtained as a function of sampleDist and geoFilter is a one-dimensional linear array of filter weights. In an example, $$idx = \min((\mathrm{abs}(\mathrm{sample\_dist}) + 8) \gg 4, maxIdx),$$

where the maxIdx is the maximum value that the idx can assume.

Operation S105: store the prediction mode information (e.g. motion information comprising motion vectors or intra-prediction information) of the current block according to the division which is disclosed in operation S101 and according to the combination method which is disclosed in operation 104.

Specifically, in a first embodiment of decoding process for GEO prediction mode:

This process is invoked when decoding a coding unit with MergeTriangleFlag[xCb][yCb] equal to 1 or with geo_flag [xCb][yCb] equal to 1.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, the luma motion vectors in 1/16 fractional-sample accuracy mvA and mvB, the chroma motion vectors mvCA and mvCB, the reference indices refIdxA and refIdxB, the prediction list flags predListFlagA and predListFlagB.

Outputs of this process are:

an (cbWidth)×(cbHeight) array $predSamples_L$ of luma prediction samples, an (cbWidth/2)×(cbHeight/2) array $predSamples_{Cb}$ of chroma prediction samples for the component Cb, an (cbWidth/2)×(cbHeight/2) array $predSamples_{Cr}$ of chroma prediction samples for the component Cr.

Let $predSamplesLA_L$ and $predSamplesLB_L$ be (cbWidth)×(cbHeight) arrays of predicted luma sample values and, $predSamplesLA_{Cb}$, $predSamplesLB_{Cb}$, $predSamplesLA_{Cr}$ and $predSamplesLB_{Cr}$ be (cbWidth/2)×(cbHeight/2) arrays of predicted chroma sample values.

The $predSamples_L$, $predSamples_{Cb}$ and $predSamples_{Cr}$ are derived by the following ordered operations:

1. For N being each of A and B, the following applies:

The reference picture consisting of an ordered two-dimensional array $refPicLN_L$ of luma samples and two ordered two-dimensional arrays $refPicLN_{Cb}$ and $refPicLN_{Cr}$ of chroma samples is derived b with X set equal to predListFlagN and refIdxX set equal to refIdxN as input.

The array $predSamplesLN_L$ is derived with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array $refPicLX_L$ set equal to $refPicLN_L$, the variable bdofFlag set equal to FALSE, and the variable cIdx is set equal to 0 as inputs.

The array $predSamplesLN_{Cb}$ is derived with the luma location (xCb, yCb), the coding block width sbWidth set equal to cbWidth/2, the coding block height sbHeight set equal to cbHeight/2, the motion vector offset mvOffset set equal to (0, 0), the motion vector mvLX set equal to mvCN, and the reference array $refPicLX_{Cb}$ set equal to $refPicLN_{Cb}$, the variable bdofFlag set equal to FALSE, and the variable cIdx is set equal to 1 as inputs.

The array $predSamplesLN_{Cr}$ is derived with the luma location (xCb, yCb), the coding block width sbWidth set equal to cbWidth/2, the coding block height sbHeight set equal to cbHeight/2, the motion vector offset mvOffset set equal to (0, 0), the motion vector mvLX set equal to mvCN, and the reference array $refPicLX_{Cr}$ set equal to $refPicLN_{Cr}$, the variable bdofFlag set equal to FALSE, and the variable cIdx is set equal to 2 as inputs.

2. If geo_flag[xCb][yCb] is equal to 1, the geometric partitioning related variables angleIdx and distanceIdx are set according to the value of geo_partitioning_idx [xCb][yCb] as specified in Table 1.

a. The sample weight derivation process for geometric partitioning merge mode is invoked. Input to the process are three ordered arrays sampleWeightL, sampleWeightC and motionWeight of size (cbWidth)×(cbHeight), (cbWidth/2)×(cbHeight/2) and (cbWidth/4)×(cbHeight/4) respectively, as well as the variables angleIdx, distanceIdx, cbWidth and cbHeight.

b. The prediction samples inside the current luma coding block, $$predSamplesL[xL][yL] \text{ with } xL = 0 \ldots cbWidth - 1 \text{ and } yL = 0 \ldots cbHeight - 1,$$

are derived by invoking the weighted sample prediction process for geometric partitioning merge mode with the coding block width nCbW set equal to cbWidth, the coding block height nCbH set equal to cbHeight, the sample arrays predSamplesLAL, predSamplesLBL, predWeightL and cIdx equal to 0 as inputs.

c. The prediction samples inside the current chroma component Cb coding block, $$predSamplesCb[xC][yC] \text{ with } xC = 0 \ldots cbWidth/2 - 1 \text{ and } yC = 0 \ldots cbHeight/2 - 1,$$

are derived by invoking the weighted sample prediction process for geometric partitioning merge mode with the coding block width nCbW set equal to cbWidth/2, the coding block height nCbH set equal to cbHeight/2, the sample arrays predSamplesLACb, predSamplesLBCb, predWeightC and cIdx equal to 1 as inputs.

d. The prediction samples inside the current chroma component Cr coding block, $$preSamplesCr[xC][yC] \text{ with } xC = 0 \ldots cbWidth/2 - 1 \text{ and } yC = 0 \ldots cbHeight/2 - 1,$$

are derived by invoking the weighted sample prediction process for geometric partitioning merge mode with the coding block width nCbW set equal to cbWidth/2, the coding block height nCbH set equal to cbHeight/2, the sample arrays predSamplesLACr, predSamplesLBCr, predWeightC and cIdx equal to 2 as inputs.

e. The motion vector storing process for geometric merge mode is invoked with the luma coding block location (xCb, yCb), the luma coding block width cbWidth, the luma coding block height cbHeight, the sample array motionWeight, the luma motion vectors mvA and mvB, the reference indices refIdxA and refIdxB, and the prediction list flags predListFlagA and predListFlagB as inputs.

Reference Picture Mapping Process for Triangle Merge Mode

Input to this process are:

a variable X representing a reference list being equal to 0 or 1, a reference index refIdxN.

Output of this process is:

a reference index refIdxTemp.

The variable refPicPoc is derived as follows:

$$refPicPoc = (X == 0)\ ?\ RefPicList[0][refIdxN]:RefPicList[1][refIdxN] \quad (8\text{-}878)$$

The reference picture list refPicListTemp is derived as follows:

$$RefPicListTemp = (X == 0)\ ?\ RefPicList[1]:RefPicList[0] \quad (8\text{-}879)$$

The variable refIdxTemp is derived as follows:

The variable mapStop is set equal to FALSE.

For the variable $refIdx_m$ with $$m = 0 \ldots NumRefIdxActive[1] - 1,$$

the following applies until mapStop is equal to FALSE:

$$refIdxTemp = (refPicListTemp[refIdx_m] == refPicPoc)\ ?\ refIdx_m: -1 \quad (8\text{-}880)$$

$$mapStop = (refIdxTemp\ != -1)\ ?\ \text{TRUE:FALSE} \quad (8\text{-}881)$$

Sample Weight Derivation Process for Geometric Partitioning Merge Mode

Inputs to this process are:

two variables nCbW and nCbH specifying the width and the height of the current coding block, two variables angleIdx and distanceIdx which specify the angle and distance lookup values of the current geometric partitioning mode, a (nCbW)×(nCbH) array $sampleWeight_L$, a (nCbW/2)×(nCbH/2) array $sampleWeight_C$, a (nCbW/4)×(nCbH/4) array motionWeight.

Output of this process are the same three arrays $sampleWeight_L$, $sampleWeight_C$ and motionWeight of per-sample weight values having a range from 0 . . . 8.

1. The luma blending weights stored in $sampleWeight_L$, for the current geometric partitioning mode are derived as follows:

The value of the following variables are set:

$$wIdx \text{ is set to } \log2(nCbW) - 3,$$

$$hIdx \text{ is set to } \log2(nCbH) - 3,$$

$$stepOffset \text{ is set to } 64,$$

the following variables are set according to the comparison of (wIdx>=hIdx):

$$whRatio = (wIdx >= hIdx)\ ?\ wIdx - hIdx:hIdx - wIdx \quad (8\text{-}882)$$

$$wIsLargerH = (wIdx >= hIdx)\ ?\ \text{true:false} \quad (8\text{-}883)$$

$$scaleStep = (wIdx >= hIdx)\ ?\ (1 << hIdx):(1 << wIdx) \quad (8\text{-}884)$$

displacementX is set to angleIdx displacementY is set to (displacementX+8)% 32 angleN is set to:

$$angleN = angleIdx \text{ if } angleIdx >= 0\ \&\&\ angleIdx <= 8,$$

$$angleN = 16 - angleIdx \text{ if } angleIdx > 8\ \&\&\ angleIdx <= 16,$$

$$angleN = angleIdx - 16 \text{ if } angleIdx > 16\ \&\&\ angleIdx <= 24,$$

$$angleN = 32 - angleIdx \text{ otherwise},$$

further, angleN is set to the following value, depending on wIsLargerH:

$$angleN = (wIsLargerH)\ ?\ 8 - angleN:angleN$$

stepDis is set according to the values of whRatio and angleN as specified in Table 2 and further, $$stepSize = stepDis + stepOffset$$

rho is set to the following value using the look-up table denoted as Dis, specified in Table 3:

$$rho = distanceIdx * stepScale * scaleStep + nCbW * Dis[displacementX] + nCbH * Dis[displacementY]. \quad (8\text{-}885)$$

For each sample position $$x = 0 \ldots nCbW - 1 \text{ and } y = 0 \ldots nCbH - 1$$

the value of $sampleWeight_L[x][y]$ is derived in the following manner:

a distance distFromLine is calculated using the look-up table denoted as Dis, specified in Table 3 as follows:

$$distFromLine = ((x \ll 1) + 1) * Dis[displacemtnX] + ((y \ll 1) + 1)) * Dis[displacementY] - tho. \quad (8\text{-}886)$$

A scaled distance distScaled is derived as:

$$distScaled = \min((\text{abs}\ (distFromLine) + 8) >> 4,\ 14). \quad (8\text{-}887)$$

The value of $sampleWeight_L[x][y]$ is set according to the filter weight look-up table, denoted as GeoFilter specified in Table 4 as:

$$sampleWeight_L[x][y] = GeoFilter[distScaled] \text{ if } distFromLine <= 0$$

$$sampleWeight_L[x][y] = 8 - GeoFilter[distScaled] \text{ if } distFromLine > 0$$

2. The chroma weights stored in $sampleWeight_C$ for the current geometric partitioning mode are derived as follows:
   For each sample position $$x = 0 \ldots (nCbW/2) - 1 \text{ and } y = 0 \ldots (nCbH/2) - 1$$

the value of $sampleWeight_C[x][y]$ is derived in the following manner:

$$sampleWeight_C[x][y] = sampleWeight_L[(x \ll 1)][(y \ll 1)]$$

3. The motion weights stored in the array motionWeight for the current geometric partitioning mode are derived as follows:
   The following variables are set:

$$threshScaler = ((\log2(nCbW) + \log2(nCbH)) \gg 1) - 1$$

$$threshLower = 32 \gg threshScaler$$

$$threshUpper = 32 - threshLower$$

For each sample position $$x = 0 \ldots (nCbW/4) - 1 \text{ and } y = 0 \ldots (nCbH/4) - 1$$

the value of motionWeight[x][y] is derived in the following manner:

$$Cnt = sampleWeight_L[(x \ll 2)][(y \ll 2)] + sampleWeight_L[(x \ll 2) + 3][(y \ll 2)] + sampleWeight_L[(x \ll 2)][(y \ll 2) + 3] + sampleWeight_L[(x \ll 2) + 3][(y \ll 2) + 3]$$

The value of motionWeight[x][y] is set to:

$$motionWeight[x][y] = 0, \text{ if } Cnt <= threshLower$$

$$motionWeight[x][y] = 1, \text{ if } Cnt >= thresholdUpper$$

$$motionWeight[x][y] = 2, \text{ otherwise}$$

Weighted Sample Prediction Process for Geometric Partitioning Merge Mode

Inputs to this process are:

two variables nCbW and nCbH specifying the width and the height of the current coding block, two (nCbW)×(nCbH) arrays predSamplesLA and predSamplesLB, an (nCbW)×(nCbH) array sampleWeight, a variable cIdx specifying colour component index.

Output of this process is the (nCbW)×(nCbH) array pbSamples of prediction sample values.

The variable bitDepth is derived as follows:

If cIdx is equal to 0, bitDepth is set equal to $BitDepth_Y$.

Otherwise, bitDepth is set equal to $BitDepth_C$.

Variables shift1 and offset1 are derived as follows:

The variable shift1 is set equal to Max(5, 17−bitDepth).

The variable offset1 is set equal to $$1 \ll (\text{shift1} - 1).$$

The prediction sample values are derived as follows:

$$pbSamples[x][y] = \text{Clip3}(0, (1 \ll bitDepth) - 1, (preSamplesLA[x][y] * sampleWeight[x][y] + predSamplesLB[x][y] * (8 - sampleWeight[x][y]) + \text{offset1}) \gg \text{shift1})$$

Motion Vector Storage for Geometric Partioning Merge Mode

This process is invoked when decoding a coding unit with geo_flag[xCb][yCb] equal to 1.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, an array motionWeight of size (cbWidth/4)×(cbHeight/4) containing motion assignment indices, the luma motion vectors in 1/16 fractional-sample accuracy mvA and mvB, the reference indices refIdxA and refIdxB, the prediction list flags predListFlagA and predListFlagB.

The variables numSbX and numSbY specifying the number of 4×4 blocks in the current coding block in horizontal and vertical direction are set equal to $$numSbX = cbWidth \gg 2 \text{ and } numSbY = cbHeight \gg 2.$$

The variable minSb is set equal to min (numSbX, numSbY).

The variable refIdxTempA is derived by invoking the reference picture mapping process for triangle merge mode with X set equal to predListFlagA and refIdxN set equal to refIdxA as inputs.

The variable refIdx TempB is derived by invoking the reference picture mapping process for triangle merge mode with the X set equal to predListFlagB and refIdxN set equal to refIdxB as inputs.

For each 4×4 subblock at subblock index (xSbIdx, ySbIdx) with $$xSbIdx = 0 \ldots numSbX - 1, \text{ and } ySbIdx = 0 \ldots numSbY - 1,$$

the following applies:

If motionWeight[xSbIdx][ySbIdx] is equal to 0, the following applies:

$$predFlagL0 = (predListFlagA == 0)\ ?\ 1:0 \quad (8\text{-}888)$$

$$predFlagL1 = (predListFlagA == 0)\ ?\ 0:1 \quad (8\text{-}889)$$

$$refIdxL0 = (predListFlagA == 0)\ ?\ refIdxA: -1 \quad (8\text{-}890)$$

$$refIdxL1 = (predListFlagA == 0)\ ?\ -1:refIdxA \quad (8\text{-}891)$$

$$mvL0[0] = (predListFlagA == 0)\ ?\ mvA[0]:[0] \quad (8\text{-}892)$$

$$mvL0[1] = (predListFlagA == 0)\ ?\ mvA[1]:[0] \quad (8\text{-}893)$$

$$mvL1[0] = (predListFlagA == 0)\ ?\ 0:mvA[0] \quad (8\text{-}894)$$

$$mvL1[1] = (predListFlagA == 0)\ ?\ 0:mvA[1] \quad (8\text{-}895)$$

Otherwise, if motionWeight[xSbIdx][ySbIdx] is equal to 1, the following applies:

$$predFlagL0 = (predListFlagB == 0)\ ?\ 1:0 \quad (8\text{-}896)$$

$$predFlagL1 = (predListFlagB == 0)\ ?\ 0:1 \quad (8\text{-}897)$$

$$refIdxL0 = (predListFlagB == 0)\ ?\ refIdxB: -1 \quad (8\text{-}898)$$

$$refIdxL1 = (predListFlagB == 0)\ ?\ -1:refIdxB \quad (8\text{-}899)$$

$$mvL0[0] = (predListFlagB == 0)\ ?\ mvB[0]:[0] \quad (8\text{-}900)$$

$$mvL0[1] = (predListFlagB == 0)\ ?\ mvB[1]:[0] \quad (8\text{-}901)$$

$$mvL1[0] = (predListFlagB == 0)\ ?\ 0:mvB[0] \quad (8\text{-}902)$$

$$mvL1[1] = (predListFlagB == 0)\ ?\ 0:mvB[1] \quad (8\text{-}903)$$

Otherwise (motionWeight[xSbIdx][ySbIdx] is equal to 2), the following applies:

If predListFlagA+predListFlagB is equal to 1, $$prefFlagL0 = 1 \quad (8\text{-}904)$$

$$predFlagL1 = 1 \quad (8\text{-}905)$$

$$refIdxL0 = (predListFlagA == 0)\ ?\ refIdxA:refIdxB \quad (8\text{-}906)$$

$$refIdxL1 = (predListFlagA == 0)\ ?\ refIdxB:refIdxA \quad (8\text{-}907)$$

$$mvL0[0] = (predListFlagA == 0)\ ?\ mvA[0]:mvB[0] \quad (8\text{-}908)$$

$$mvL0[1] = (predListFlagA == 0)\ ?\ mvA[1]:mvB[1] \quad (8\text{-}909)$$

$$mvL1[0] = (predListFlagA == 0)\ ?\ mvB[0]:mvA[0] \quad (8\text{-}910)$$

$$mvL1[1] = (predListFlagA == 0)\ ?\ mvB[1]:mvA[1] \quad (8\text{-}911)$$

If predListFlagA+predListFlagB is equal to 0, the following applies:

$$predFlagL0 = 1 \quad (8\text{-}912)$$

$$predFlagL1 = (refIdxTempA == -1\ \&\&\ refIdxTempB == -1)\ ?\ 0:1 \quad (8\text{-}913)$$

$$refIdxL0 = (refIdxTempB\ != -1)\ ?\ refIdxA:((refIdxTempA\ != -1)\ ?\ refIdxB:refIdxA) \quad (8\text{-}914)$$

$$refIdxL1 = (refIdxTempB\ != -1)\ ?\ refIdxB:((refIdxTempA\ != -1)\ ?\ refIdxTempA: -1) \quad (8\text{-}915)$$

$$mvL0[0] = (refIdxTempB\ != -1)\ ?\ mvA[0]:((refIdxTempA\ != -1)\ ?\ mvB[0]:mvA[0]) \quad (8\text{-}916)$$

$$mvL0[1] = (refIdxTempB\ != -1)\ ?\ mvA[1]:((refIdxTempA\ != -1)\ ?\ mvB[1]:mvA[1]) \quad (8\text{-}917)$$

$$mvL1[0] = (refIdxTempB\ != -1)\ ?\ mvB[0]:((refIdxTempA\ != -1)\ ?\ mvA[0]:0) \quad (8\text{-}918)$$

$$mvL1[1] = (refIdxTempB\ != -1)\ ?\ mvB[1]:((refIdxTempA\ != -1)\ ?\ mvA[1]:0) \quad (8\text{-}919)$$

If predListFlagA+predListFlagB is equal to 2, the following applies:

$$predFlagL0 = (refIdxTempA == -1\ \&\&\ refIdxTempB == -1)\ ?\ 0:1 \quad (8\text{-}920)$$

$$predFlagL1 = 1 \quad (8\text{-}921)$$

$$refIdxL0 = (refIdxTempB\ != -1)\ ?\ refIdxTempB:((refIdxTempA\ != -1)\ ?\ refIdxTempA: -1) \quad (8\text{-}922)$$

$$refIdxL1 = (refIdxTempB\ != -1)\ ?\ refIdxA:((refIdxTempA\ != -1)\ ?\ refIdxB:refIdxA) \quad (8\text{-}923)$$

$$mvL0[0] = (refIdxTempB\ != -1)\ ?\ mvB[0]:((refIdxTempA\ != -1)\ ?\ mvA[0]:0) \quad (8\text{-}924)$$

$$mvL0[1] = (refIdxTempB\ != -1)\ ?\ mvB[1]:((refIdxTempA\ != -1)\ ?\ mvA[1]:0) \quad (8\text{-}925)$$

$$mvL1[0] = (refIdxTempB\ != -1)\ ?\ mvA[0]:((refIdxTempA\ != -1)\ ?\ mvB[0]:mvA[0]) \quad (8\text{-}926)$$

$$mvL1[1] = (refIdxTempB\ != -1)\ ?\ mvA[1]:((refIdxTempA\ != -1)\ ?\ mvB[1]:mvA[1]) \quad (8\text{-}927)$$

The following assignments are made for x=0 . . . 3 and y=0 . . . 3:

$$MvL0[(xSbIdx << 2) + x][(ySbIdx << 2) + y] = mvL0 \quad (8\text{-}928)$$

$$MvL1[(xSbIdx << 2) + x][(ySbIdx << 2) + y] = mvL1 \quad (8\text{-}929)$$

$$RefIdxL0[(xSbIdx << 2) + x][(ySbIdx << 2) + y] = refIdxL0 \quad (8\text{-}930)$$

$$RefIdxL1[(xSbIdx << 2) + x][(ySbIdx << 2) + y] = refIdxL1 \quad (8\text{-}931)$$

$$PredFlagL0[(xSbIdx << 2) + x][ySbIdx << 2) + y] = predFlagL0 \quad (8\text{-}932)$$

$$PredFlagL1[(xSbIdx << 2) + x][ySbIdx << 2) + y] = predFlagL1 \quad (8\text{-}933)$$

TABLE 1

Specification of the angleIdx and distanceIdx values based on the geo_partition_idx value.

| geo_partition_idx | angleIdx | distanceIdx |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 1 |
| 20 | 4 | 2 |
| 21 | 4 | 3 |
| 22 | 4 | 4 |
| 23 | 5 | 0 |
| 24 | 5 | 1 |
| 25 | 5 | 2 |
| 26 | 5 | 3 |
| 27 | 5 | 4 |
| 28 | 6 | 0 |
| 29 | 6 | 1 |
| 30 | 6 | 2 |
| 31 | 6 | 3 |
| 32 | 6 | 4 |
| 33 | 7 | 0 |
| 34 | 7 | 1 |
| 35 | 7 | 2 |
| 36 | 7 | 3 |
| 37 | 7 | 4 |
| 38 | 8 | 1 |
| 39 | 8 | 2 |
| 40 | 8 | 3 |
| 41 | 8 | 4 |
| 42 | 9 | 0 |
| 43 | 9 | 1 |
| 44 | 9 | 2 |
| 45 | 9 | 3 |
| 46 | 9 | 4 |
| 47 | 10 | 0 |
| 48 | 10 | 1 |
| 49 | 10 | 2 |
| 50 | 10 | 3 |
| 51 | 10 | 4 |
| 52 | 11 | 0 |
| 53 | 11 | 1 |

TABLE 1-continued

Specification of the angleIdx and distanceIdx values based on the geo_partition_idx value.

| geo_partition_idx | angleIdx | distanceIdx |
|---|---|---|
| 54 | 11 | 2 |
| 55 | 11 | 3 |
| 56 | 11 | 4 |
| 57 | 12 | 1 |
| 58 | 12 | 2 |
| 59 | 12 | 3 |
| 60 | 12 | 4 |
| 61 | 13 | 0 |
| 62 | 13 | 1 |
| 63 | 13 | 2 |
| 64 | 13 | 3 |
| 65 | 13 | 4 |
| 66 | 14 | 0 |
| 67 | 14 | 1 |
| 68 | 14 | 2 |
| 69 | 14 | 3 |
| 70 | 14 | 4 |
| 71 | 15 | 0 |
| 72 | 15 | 1 |
| 73 | 15 | 2 |
| 74 | 15 | 3 |
| 75 | 15 | 4 |
| 76 | 16 | 1 |
| 77 | 16 | 2 |
| 78 | 16 | 3 |
| 79 | 16 | 4 |
| 80 | 17 | 1 |
| 81 | 17 | 2 |
| 82 | 17 | 3 |
| 83 | 17 | 4 |
| 84 | 18 | 1 |
| 85 | 18 | 2 |
| 86 | 18 | 3 |
| 87 | 18 | 4 |
| 88 | 19 | 1 |
| 89 | 19 | 2 |
| 90 | 19 | 3 |
| 91 | 19 | 4 |
| 92 | 20 | 1 |
| 93 | 20 | 2 |
| 94 | 20 | 3 |
| 95 | 20 | 4 |
| 96 | 21 | 1 |
| 97 | 21 | 2 |
| 98 | 21 | 3 |
| 99 | 21 | 4 |
| 100 | 22 | 1 |
| 101 | 22 | 2 |
| 102 | 22 | 3 |
| 103 | 22 | 4 |
| 104 | 23 | 1 |
| 105 | 23 | 2 |
| 106 | 23 | 3 |
| 107 | 23 | 4 |
| 108 | 24 | 1 |
| 109 | 24 | 2 |
| 110 | 24 | 3 |
| 111 | 24 | 4 |
| 112 | 25 | 1 |
| 113 | 25 | 2 |
| 114 | 25 | 3 |
| 115 | 25 | 4 |
| 116 | 26 | 1 |
| 117 | 26 | 2 |
| 118 | 26 | 3 |
| 119 | 26 | 4 |
| 120 | 27 | 1 |
| 121 | 27 | 2 |
| 122 | 27 | 3 |
| 123 | 27 | 4 |
| 124 | 28 | 1 |
| 125 | 28 | 2 |
| 126 | 28 | 3 |
| 127 | 28 | 4 |
| 128 | 29 | 1 |

TABLE 1-continued

Specification of the angleIdx and distanceIdx values based on the geo_partition_idx value.

| geo_partition_idx | angleIdx | distanceIdx |
|---|---|---|
| 129 | 29 | 2 |
| 130 | 29 | 3 |
| 131 | 29 | 4 |
| 132 | 30 | 1 |
| 133 | 30 | 2 |
| 134 | 30 | 3 |
| 135 | 30 | 4 |
| 136 | 31 | 1 |
| 137 | 31 | 2 |
| 138 | 31 | 3 |
| 139 | 31 | 4 |

TABLE 2-continued

Specification of the step distance stepDis according to the values of whRatio and angleN.

| whRatio | angleN | stepDis |
|---|---|---|
| 3 | 2 | 306 |
| 3 | 3 | 438 |
| 3 | 4 | 549 |
| 3 | 5 | 636 |
| 3 | 6 | 694 |
| 3 | 7 | 721 |
| 3 | 8 | 717 |
| 4 | 0 | 0 |
| 4 | 1 | 318 |
| 4 | 2 | 619 |
| 4 | 3 | 893 |
| 4 | 4 | 1129 |
| 4 | 5 | 1317 |
| 4 | 6 | 1450 |
| 4 | 7 | 1524 |
| 4 | 8 | 1536 |

TABLE 3

Look-up table Dis for derivation of geometric partitioning distance.

| | idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Dis[idx] | 64 | 63 | 59 | 53 | 45 | 36 | 24 | 12 | 0 | −12 | −24 | −36 | −45 | −53 | −59 | −63 |
| | idx | | | | | | | | | | | | | | | |
| | 16 | 17 | 18 | 19 | 20 | 21 | 22 | 23 | 24 | 25 | 26 | 27 | 28 | 29 | 30 | 31 |
| Dis[idx] | −64 | −63 | −59 | −53 | −45 | −36 | −24 | −12 | 0 | 12 | 24 | 36 | 45 | 53 | 59 | 63 |

TABLE 2

Specification of the step distance stepDis according to the values of whRatio and angleN.

| whRatio | angleN | stepDis |
|---|---|---|
| 0 | 0 | 0 |
| 0 | 1 | 18 |
| 0 | 2 | 31 |
| 0 | 3 | 40 |
| 0 | 4 | 42 |
| 0 | 5 | 40 |
| 0 | 6 | 31 |
| 0 | 7 | 18 |
| 0 | 8 | 0 |
| 1 | 0 | 0 |
| 1 | 1 | 38 |
| 1 | 2 | 71 |
| 1 | 3 | 97 |
| 1 | 4 | 115 |
| 1 | 5 | 125 |
| 1 | 6 | 126 |
| 1 | 7 | 118 |
| 1 | 8 | 102 |
| 2 | 0 | 0 |
| 2 | 1 | 78 |
| 2 | 2 | 149 |
| 2 | 3 | 210 |
| 2 | 4 | 260 |
| 2 | 5 | 295 |
| 2 | 6 | 315 |
| 2 | 7 | 319 |
| 2 | 8 | 307 |
| 3 | 0 | 0 |
| 3 | 1 | 158 |

TABLE 4

Filter weight look-up table GeoFilter for derivation of geometric partitioning filter weights.

| | idx | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| GeoFilter[idx] | 4 | 4 | 5 | 5 | 5 | 5 | 6 | 6 | 6 | 6 | 7 | 7 | 7 | 7 | 8 |

In a second embodiment of decoding process for GEO prediction mode, the motion information storage process is following:

Subdivide the coding block into K motion storage units, a size of the coding block is M×N luma samples, in an example, each motion storage unit has a same size of (M/K)×(N/K) luma samples. In an example, a value of K is 4, a value of M is 16 and a value of N is 16, in this example, each motion storage unit is associated with a luma sub-block of size 4×4. The top-left luma position (x,y) of the coding block is associated with the top-left position (x/K, y/K) of the motion storage block.

For a motion storage unit, decide whether a first uni-prediction motion information, a second uni-prediction motion information, or a bi-prediction motion information is stored, according to a first sample weight or a second sample weight. In an example, the decision is according to a distance for a sample in the motion storage unit to a split boundary. The sample can be integer sample or fractional sample. The separation line is defined as the split line of geometric partition mode. According to one example, the K is equal to 4 (a width and height of the motion storage unit in terms of luma samples). An example for dividing a coding block into motion storage units is depicted in FIG. 13.

According to one example, the distance between a sample and a split boundary can be calculated as follow: For a luma sample in a block, a sample distance (sample_dist) is calculated, the sample distance represents a distance of the luma sample to the separation line of the block.

In an example, a sample distance sample_dist is calculated according to the formula:

$$\text{sample\_dist} = ((x << 1) + 1) * Dis[angleIdx1] + ((y << 1) + 1)) * Dis[angleIdx2] - \text{offset}(distanceIdx).$$

Value of angleIdx1 and value of angleIdx2 are obtained from the bitstream or derived/calculated based on other information obtained from the bistream, angleIdx1 and angleIdx2 represent quantized trigonometric parameters of a separation line, the first one of type cosine and the second one of type sine.

x and y are the −x and −y coordinates of a sample with respect to top-left sample of a coding block.

offset (distanceIdx) is an offset value which is a function of an index value (distanceIdx), the index value is obtained from the bistream or derived/calculated based on other information obtained from the bistream.

Dis[ ] is a lookup table. Dis[angleIdx1] describes the change in the sample distance (sample_dist) w.r.t. to a unit increase (an increase of value 1) in the −x coordinate of the said sample. The Dis[angleIdx2] describes the change in the sample distance (sample_dist) with respect to a unit increase (an increase of value 1) in the −y coordinate of the said sample.

It is noted that the coordinator of above example is according to top left position of the current coding block, not according to the top-left position of the current coding block.

It is noted that the above example shows a method of calculation according to integer arithmetic. Embodiments of the disclosure is not limited to those examples of calculation of the sample_dist.

It is noted that the according to above example, the sample coordinator is left shifted one bit ((x<<1), (y<<1)). In this example the distance calculate can be performed up to ½ sample precision for integer arithmetic, for example the sample position in (0.5, 0.5) can be calculated.

Figure 18:
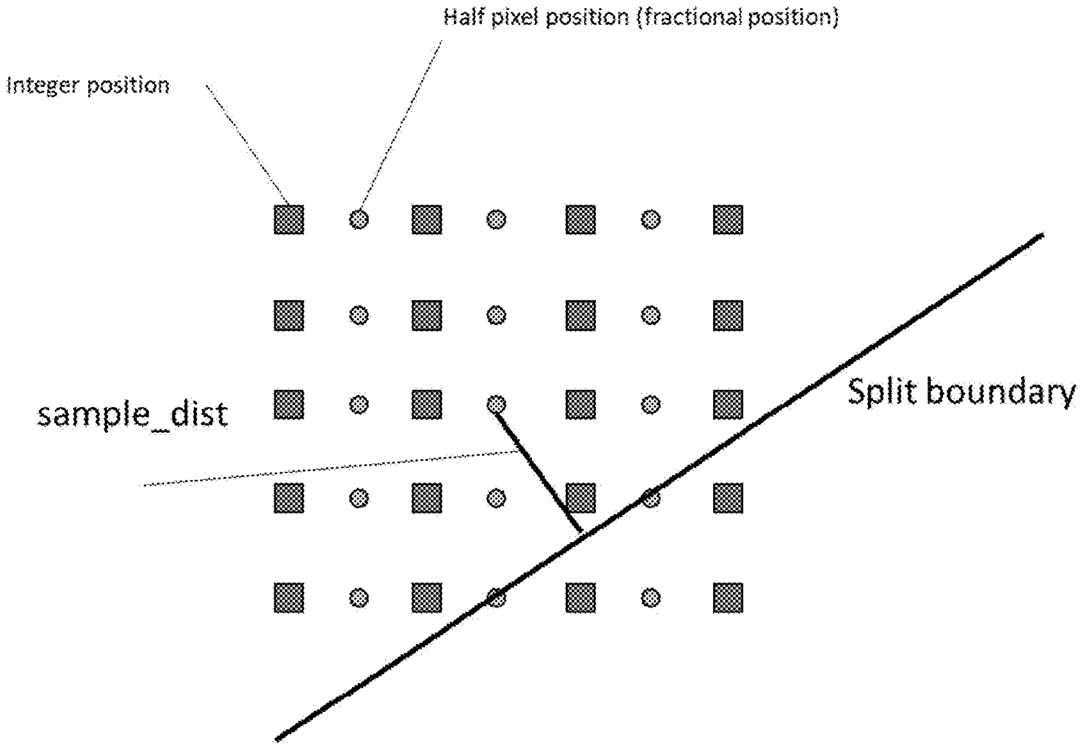
FIG. 18 is a diagram showing an example of the 4×4 motion storage example with integer position and half pixel position.

FIG. 18 shows the 4×4 motion storage example with integer position and half pixel position (fractional position, spit boundary and the distance between a sample and the split boundary (sample_dist).

In an example, decision refers to whether to store a first uni-prediction motion information, labeled Mv0, a second uni-prediction motion information, labeled Mv1, or a combined motion information, such as a bi-prediction motion information, labeled Mv2, is taken, according to the following operations. In an example, the decision is executed for a motion storage unit; in another example, the decision is executed for at least two (or all) motion storage units contained in the coding block. The top-left coordinate of a motion storage unit is given by (x/K, y/K), and the width and the height of the motion storage unit is given by K in terms of luma samples.

If the calculated distance sample_dist smaller than and/or equal to a threshold, a combined motion information (Mv2) is stored for the motion storage unit. The threshold can be a fixed number, can be adaptively derived based on the angle of split line, the aspect racial of the current coding block or the other parameters; otherwise (if the distance sample_dist is larger then or/and equal to a threshold), the sign of sample_dist is checked:

If the the sample_dist is negative (or positive), the MV0 (or MV1) are stored for the current motion storage unit, Otherwise (the sample_dist is positive (or negative)), the MV1 (or MV0) are stored for the current motion storage unit.

Figure 19:
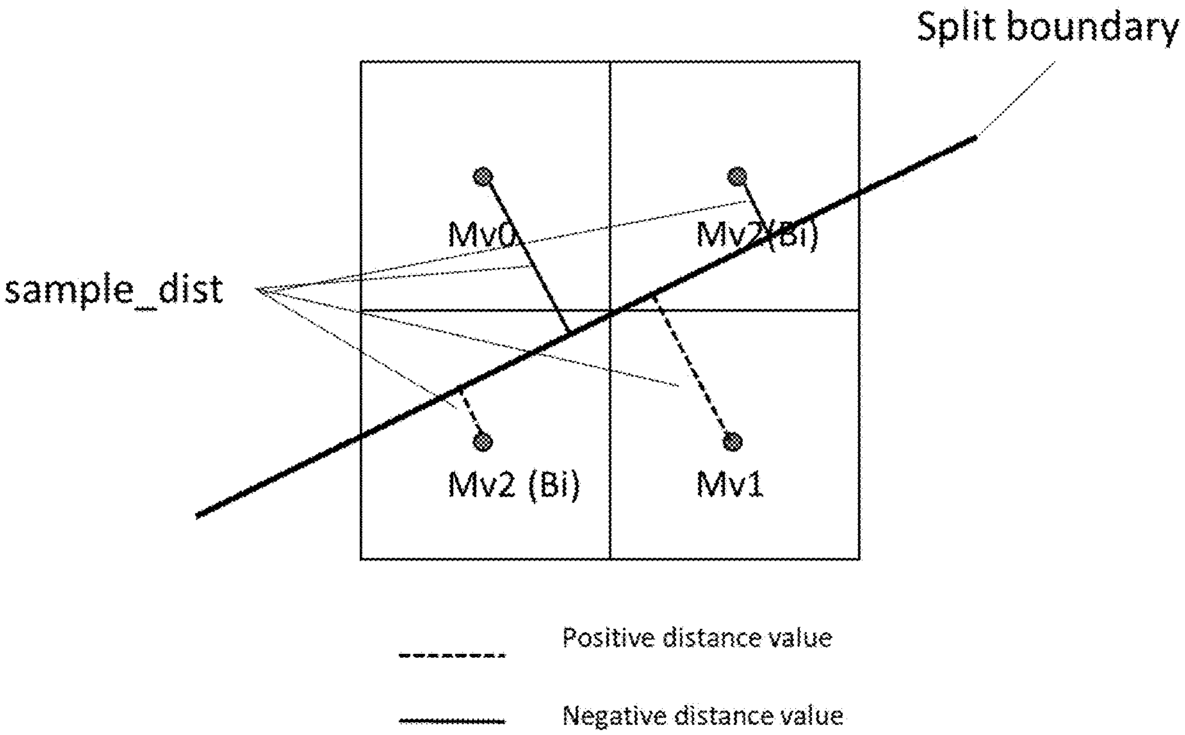
FIG. 19 is a diagram showing an example of a motion storage method.

FIG. 19 shows one example of the motion storage based on the mentioned method.

Compared with other motion storage method, this method only need to calculate one sample distance each motion storage unit, which reduces the calculation complexity.

Figure 20:
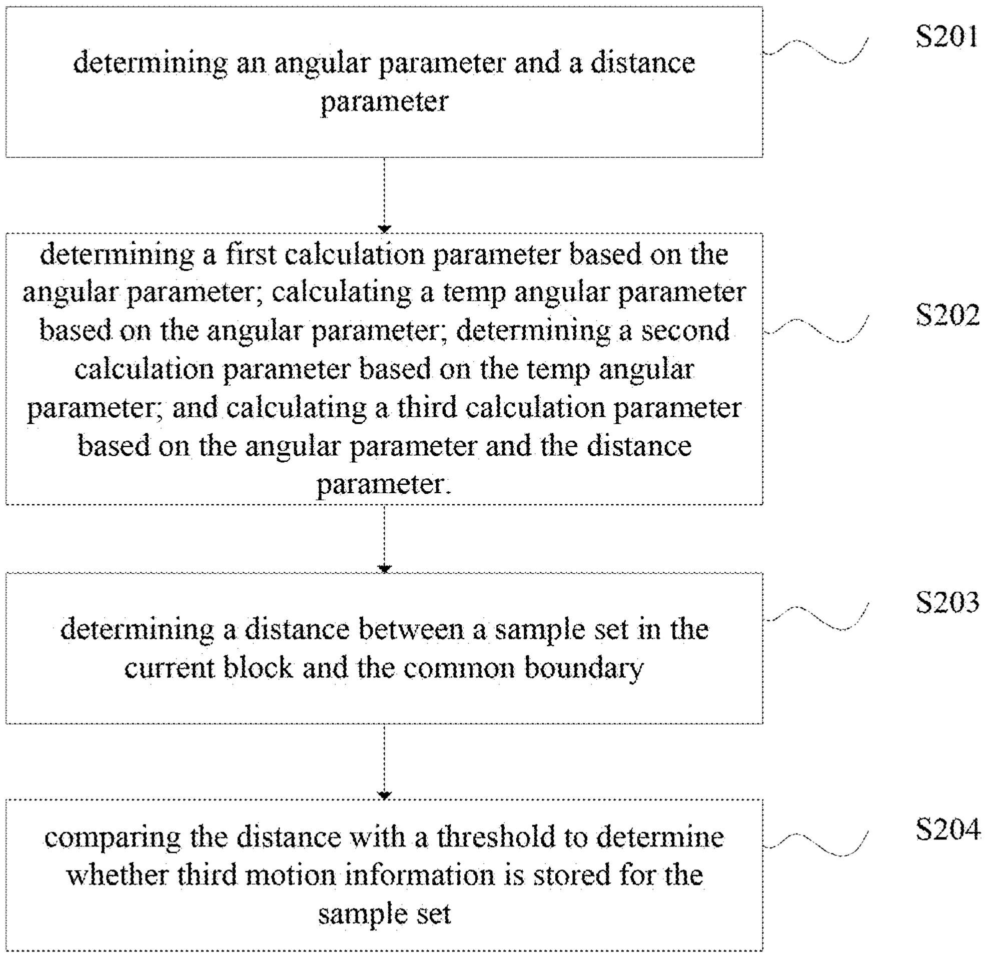
FIG. 20 is a block diagram illustrating an example of a motion information storage method.

In a third embodiment of decoding process for GEO prediction mode, as shown in FIG. 20, is following:

For the video coding technique which allows bi-prediction, two reference frame lists are used, for example, List0 and List1, or Forward Reference frame list and Backward Reference frame list. As an example, motion information comprises:

(1) Prediction Flag L0 (PFL0) and Prediction Flag L1 (PFL1), wherein when Prediction Flag L0 is true, List0 will be used in an inter prediction, otherwise (Prediction Flag L0 is false), List0 will not be used. Prediction Flag L1 is similar.

(2) Reference Index L0 (RIL0) and Reference Index L1 (RIL1), Reference Index L0 is used to indicate which reference frame (candidate) from List0 is used as a current reference frame. Reference Index L1 is similar. And in an embodiment, Reference Index L0 equals to −1 means no reference frame is used from List0.

(3) Motion Vector L0 (MVL0) and Motion Vector L1 (MVL1), correspond to List0 and List1 respectively and both of them have a horizontal component and a vertical component.

After the motion information are determined for a current block, in an embodiment, the motion information might be stored and used as reference information for the prediction process of the future coding blocks, for example, as prediction motion information of the neighboring block in a spatial prediction or a temporal prediction.

The motion information is stored in a memory, more specifically, stored in motion information storage units in this embodiment.

A current block might be split into multiple sample sets, wherein each of the multiple sample sets has a same size as the sample set; or setting the current block as the sample set. For example, the sample set might be a 4×4 sample array. The size of the sample set might also be 8×8, 16×16, 8×16 and so on, which is not limited. Each of the multiple sample sets corresponds to each motion information storage unit, so the motion information of a sample set will be stored in its corresponding motion information storage unit. It is noted that there are two cases about "the motion information of a sample set". Case 1: the motion information is used for determining the prediction value of the sample set; Case 2: the motion information is assigned to the sample set for storing.

Also, in the current embodiment, the sample set is a luma sample set, and in other embodiment, the sample set might be a chroma sample set.

GEO prediction mode is introduced in the above section. Generally, in the GEO prediction, the current block consists of a first subblock and a second subblock, the first subblock and the second subblock are separated by a common boundary, the first subblock corresponds to first motion information and the second subblock corresponds to second motion information. The first subblock and the second subblock might be a triangle partition, a trapezoid partition, or an asymmetric rectangular partition and so on, which is not limited. And it is understandable that for example, in a triangle partition, each subblock is a triangle block.

As an example in the current embodiment, both the first motion information and the second motion information come from uni-prediction. The first motion information might only include RIL0, MVL0, which means PFL0=1, PFL1=0; or might only include RIL1, MVL1, which means PFL0=0, PFL1=1; similarly, the second motion information might only include RIL0, MVL0, which means PFL0=1, PFL1=0; or might only include RIL1, MVL1, which means PFL0=0, PFL1=1.

Operation S201: determining an angular parameter and a distance parameter.

The common boundary is determined by an angular parameter and a distance parameter.

(1) In a decoder:

In an embodiment, parsing the angular parameter and the distance parameter from a bitstream directly.

In another embodiment, parsing an indicator from the bitstream, and obtaining the angular parameter and the distance parameter based on the indicator. The indicator can be an index, the angular parameter and the distance parameter can be determined by checking a lookup table with such the index. Or, the angular parameter and the distance parameter can be calculated by a function, and the indicator is the input of the function.

In another embodiment, parsing two indicators from the bitstream, and obtaining the angular parameter from one of the two indicators and the distance parameter from the other one of the two indicators.

In the current embodiment, syntax element "geo_partition_idx" is parsed from a bitstream. An angular parameter "angleIdx" and a distance parameter "distanceIdx" are obtained by searching a lookup table, which defines the relationship between "geo_partition_idx" and a pair of "angleIdx" and "distanceIdx". The lookup table, for example, might be Table 1.

Operation S202: determining a first calculation parameter based on the angular parameter; calculating a temp angular parameter based on the angular parameter; determining a second calculation parameter based on the temp angular parameter; and calculating a third calculation parameter based on the angular parameter and the distance parameter.

The first calculation parameter is determined by checking a preset lookup table according to the angular parameter and the second calculation parameter is determined by checking the lookup table according to the temp angular parameter, and wherein the first calculation parameter and the second calculation parameter are a cosine value and a sine value of a same angle respectively. It is understandable that cosine and sine calculations can be simulated and replaced by a lookup table method, and the computing complexity is decreased.

In the current embodiment,

In an embodiment: The first calculation parameter is set to Dis[angleIdx], Dis[ ] is a lookup table, for example, might be Table 3.

The temp angular parameter is set to (angleIdx+8)% 32, assuming as TempIdx.

The second calculation parameter is set to Dis[TempIdx].

It is noted that theoretically, Dis[angleIdx] and Dis[TempIdx] are the approximate cosine value and sine value of a same angle, and the angle represents a geometric relationship between the common boundary and the current block.

In another embodiment: The first calculation parameter is set to Dis 1[angleIdx], Dis1[ ] is a lookup table, for example, might be Table 3.

The second calculation parameter is set to Dis2[angleIdx], Dis2[ ] is another lookup table.

It is noted that Dis1[angleIdx] and Dis2[angleIdx] are the approximate cosine value and sine value of a same angle, and the angle represents a geometric relationship between the common boundary and the current block.

The third calculation parameter is obtained as following:

$$wIdx \text{ is set to } \log2(nCbW) - 3,\ nCbW \text{ is the width of the current block;}$$

$$hIdx \text{ is set to } \log2(nCbH) - 3,\ nCbH \text{ is the height of the current block;}$$

stepOffset is set to a positive integer number, for example, set to 64.

Comparing wIdx and hIdx:

$$whRratio = (wIdx >= hIdx)\ ?\ wIdx - hIdx : hIdx - wIdx$$

$$wIsLargerH = (wIdx >= hIdx)\ ?\ \text{true}:\text{false}$$

$$scaleStep = (wIdx >= hIdx)\ ?\ (1 << hIdx):(1 << wIdx)$$

It is understandable that in another embodiment:

$$whRratio = (wIdx > hIdx)\ ?\ wIdx - hIdx : hIdx - wIdx$$

$$wIsLargerH = (wIdx > hIdx)\ ?\ \text{true}:\text{false}$$

$$scaleStep = (wIdx > hIdx)\ ?\ (1 << hIdx):(1 << wIdx)$$

angleN is set to:

$$angleN = angleIdx \quad \text{if } angleIdx >= 0\ \&\&\ angleIdx <= 8,$$

$$angleN = 16 - angleIdx \quad \text{if } angleIdx > 8\ \&\&\ angleIdx <= 16,$$

$$angleN = angleIdx - 16 \quad \text{if } angleIdx > 16\ \&\&\ angleIdx <= 24,$$

$$angleN = 32 - angleIdx \quad \text{otherwise},$$

It is noted that in the different implementations, endpoints angleIdx 0, 8, 16, 24 might belong to the different subsection, for example:

In another embodiment, angleN is set to:

$$angleN = angleIdx \quad \text{if } angleIdx > 0\ \&\&\ angleIdx < 8,$$

$$angleN = 16 - angleIdx \quad \text{if } angleIdx >= 8\ \&\&\ angleIdx < 16,$$

$$angleN = angleIdx - 16 \quad \text{if } angleIdx >= 16\ \&\&\ angleIdx < 24,$$

$$angleN = 32 - angleIdx \quad \text{otherwise},$$

Further, angleN is set to the following value:

$$angleN=(wIsLargerH)\ ?\ 8-angleN:angleN$$

stepDis is set according to the values of whRatio and angleN as specified in a lookup table, for example, Table 2.

$$stepSize=stepDis+stepOffset$$

The third calculation parameter rho is set to the following value using a lookup table denoted as Dis, for example, Table 3.

$$rho=distanceIdx*stepSize*scaleStep+nCbW*Dis[angleIdx]+nCbH*Dis[TempIdx].$$

And correspondingly, in another embodiment, the third calculation parameter rho might be set as:

$$rho=distanceIdx*stepSize*scaleStep+nCbW*Dis1[angleIdx]+nCbH*Dis2[angleIdx].$$

It is noted that since after the angular parameter and the distance parameter is the first, second and the third calculation parameter can be determined. In an embodiment, the first, second and the third calculation parameter will only be calculated once as the parameters for all samples in the current block. And the operations S201 and S202 can be skipped for the motion information storage process if the first, second and the third calculation parameter of the current block are already determined.

Operation S203: determining a distance between a sample set in the current block and the common boundary.

The distance is calculated by the following:

$$distFromLine=(x+K)*P1+(y+K)*P2-P3$$

wherein P1, P2 and P3 are the first calculation parameter, the second calculation parameter and the third calculation parameter respectively, distFromLine represents the distance, K is a non-negative integer, x represents a horizontal coordinate of a target position in the sample set, y represents a vertical coordinate of the target position in a rectangular coordinate system, where a position of the top-left sample of the current block is set as a coordinate origin, right direction is set as the positive horizontal direction and down direction is set as the positive vertical direction.

In an embodiment, K equals to 1.

$$distFromLine=(x+1)*P1+(y+1)*P2-P3.$$

It is noted that the distance between a sample set in the current block and the common boundary, generally, it is the distance between the target position in the sample set and the common boundary.

The target position in the sample set is predetermined. For example, the predetermined position might be a top-left position of the sample set, or a center position of the sample set, or other position of the sample set.

It is noted that the target position might be a position of an integer sample position in the sample set, and the target position also might be a position of a fractional sample position. For example, the target position can be a position of gravity center of the current block. More specifically, in the event the current block is a 4×4 sample array, the target position might be the position with a coordinates (1.5, 1.5) in the rectangular coordinate system of the current embodiment.

In an embodiment, the sample precision of the distance is higher than the integer sample. Correspondingly, the distance is calculated by the following:

$$distFromLine=((x<<N)+K)*P1+((y<<N)+K)*P2-P3$$

where $2^N$ represents a reciprocal of the sample precision of the distance, for example, when the sample precision of the distance is half pixel precision, N equals to 1, when the sample precision of the distance is ¼ pixel precision, N equals to 2.

As an example, the distance is calculated by the following:

$$distFromLine=((x<<1)+1)*Dis[angleIdx]+((y<<1)+1)*Dis[TempIdx]-rho$$

Operation S204: comparing the distance with a threshold to determine whether third motion information is stored for the sample set.

The third motion information is derived by the first motion information and the second information. In an embodiment, the third motion information is a combination of the first motion information and the second motion information, like motion information for a bi-prediction. More specifically, in the event the first motion information include RILX_first, MVLX_first, the second motion information include RILY_second, MVLY_second, where X might be 0 or 1, and Y might be 0 or 1, the third motion information might include all RILX_first, MVLX_first, RILY_second, MVLY_second, which means PFL0=1, PFL1=1.

In another embodiment, the third motion information might be equal to one of the first motion information or the second motion information in the event that both the first motion information and the second motion information correspond to a same list (List0 or List1). For example, if PFL0 is equal to 1 and PFL1 is equal to 0 for both the first and the second motion information, the third motion information might be set equal to the first motion information (or the second motion information, according to the different implementation). Similarly, if PFL0 is equal to 0 and PFL1 is equal to 1 for both the first and second motion information, the third motion information might be set equal to the first motion information (or the second motion information, according to the different implementation).

In an embodiment, the threshold might be a predetermined value.

In another embodiment, the threshold is based on a geometric relationship between the common boundary and a horizontal direction, or based on a geometric relationship between the common boundary and a vertical direction. More specifically, the threshold is based on an angle between a perpendicular direction of the common boundary and the horizontal direction or the vertical direction. And in other implementations, the geometric relationship might include the length relationship between the common boundary and the block boundary of the current block or subblock of the current block. In the current embodiment, the threshold might be obtained by a lookup table, for example Table 5, according to an angle calculated above.

Threshold=RhoMax[angleN].

It is noted that since angleN can be determined before operation S204, the threshold can be determined before operation S204 and for the current block.

The threshold might be also $$threshLower = -RhoMax[angleN]$$

$$threshUpper = RhoMax[angleN].$$

TABLE 5

RhoMax table for derivation of geometric partitioning motion weights.

| | idx | | | | | | | | |
|---|---|---|---|---|---|---|---|---|---|
| | 0 | 1 | 2 | 3 | 4 | 5 | 6 | 7 | 8 |
| RhoMax[idx] | 1 | 2 | 2 | 3 | 3 | 3 | 2 | 2 | 1 |

In another embodiment, the threshold might be:

$$threshLower = -K$$

threshUpper=K, where K is a predetermined positive number. For example, the value of K might be 1. In one example, the K can be obtained according to an indicator in the bitstream.

In another embodiment, the threshold is based on a width and/or a height of the current block.

It is noted that the threshold might be also determined by two or more above conditions. For example, the width and/or the height of the current block might determine a ratio, $$\text{ratio} = 1 \ll \text{abs}(\text{log2}(\text{width}) - \text{log2}(\text{height})),$$

and then the ratio is used for scaling a threshold determined by an angle. And the scaled threshold is set as the final threshold.

Comparisons between the threshold and the distance are performed:

Operation S204-1: Determining the third motion information is stored for the sample set in the event that an absolute value of the distance is smaller than or equal to the threshold;

Operation S204-2: in the event that the absolute value of the distance is larger than the threshold:

determining the first motion information is stored for the sample set in the event that the distance is positive (or negative); or, determining the second motion information is stored for the sample set in the event that the distance is negative (or positive, according to the above branch).

It is understandable that according to the different implementation, the condition in operation S204-1 might also be an absolute value of the distance is smaller than the threshold, accordingly, the condition in operation S204-2 might be the absolute value of the distance is larger than or equals to the threshold.

In another embodiment, the calculation of absolute value is replaced by more subsections.

In the current embodiment, the first motion information is stored for the sample set is stored in the event that the distance smaller than threshLower; The second motion information is stored for the sample set is stored in the event that the distance larger than threshUpper; Otherwise, the third motion information is stored for the sample set is stored.

And it is understandable that one of the first motion information, the second motion information and the third motion information is stored in the motion information storage unit corresponds to the sample set.

It is noted that when the current block might be split into multiple sample sets, in an embodiment, the above operations in the current embodiment are used to all sample sets. In another embodiment, the above operations in the current embodiment are used to only one sample set. In another embodiment, the above operations in the current embodiment are used to at least two sample sets. For the sample sets without being implemented with the above operations, in an embodiment, default motion information or motion information deduced according to a predetermined condition will be stored.

It is noted that only a distance value needs to be calculated based on a predetermined GEO partition module (function), whose module parameter can be determined on CU level, to determine the storage of motion information for a GEO partition. The computing complexity is limited.

In a fourth embodiment of decoding process for GEO prediction mode:

This process is invoked when decoding a coding unit with MergeTriangleFlag[xCb][yCb] equal to 1 or with geo_flag [xCb][yCb] equal to 1.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, the luma motion vectors in 1/16 fractional-sample accuracy mvA and mvB, the chroma motion vectors mvCA and mvCB, the reference indices refIdxA and refIdxB, the prediction list flags predListFlagA and predListFlagB.

Outputs of this process are:

an (cbWidth)×(cbHeight) array $predSamples_L$ of luma prediction samples, an (cbWidth/2)×(cbHeight/2) array $predSamples_{Cb}$ of chroma prediction samples for the component Cb, an (cbWidth/2)×(cbHeight/2) array $predSamples_{Cr}$ of chroma prediction samples for the component Cr.

Let $predSamplesLA_L$ and $predSamplesLB_L$ be (cbWidth)×(cbHeight) arrays of predicted luma sample values and, $predSamplesLA_{Cb}$, $predSamplesLB_{Cb}$, $predSamplesLA_{Cr}$ and $predSamplesLB_{Cr}$ be (cbWidth/2)×(cbHeight/2) arrays of predicted chroma sample values.

The $predSamples_L$, $predSamples_{Cb}$ and $predSamples_{Cr}$ are derived by the following ordered operations:

3. For N being each of A and B, the following applies:

The reference picture consisting of an ordered two-dimensional array $refPicLN_L$ of luma samples and two ordered two-dimensional arrays $refPicLN_{Cb}$ and $refPicLN_{Cr}$ of chroma samples is derived with X set equal to predListFlagN and refIdxX set equal to refIdxN as input.

The array $predSamplesLN_L$ is derived by invoking the fractional sample interpolation process with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array $refPicLX_L$ set equal to $refPicLN_L$, the variable bdofFlag set equal to FALSE, and the variable cIdx is set equal to 0 as inputs.

The array $predSamplesLN_{Cb}$ is derived by invoking the fractional sample interpolation process with the luma location (xCb, yCb), the coding block width sbWidth set equal to cbWidth/2, the coding block height sbHeight set equal to cbHeight/2, the motion vector offset mvOffset set equal to (0, 0), the motion vector mvLX set equal to mvCN, and the reference array $refPicLX_{Cb}$ set equal to $refPicLN_{Cb}$, the variable bdofFlag set equal to FALSE, and the variable cIdx is set equal to 1 as inputs.

The array $predSamplesLN_{Cr}$ is derived by invoking the fractional sample interpolation process with the luma location (xCb, yCb), the coding block width sbWidth set equal to cbWidth/2, the coding block height sbHeight set equal to cbHeight/2, the motion vector offset mvOffset set equal to (0, 0), the motion vector mvLX set equal to mvCN, and the reference array $refPicLX_{Cr}$ set equal to $refPicLN_{Cr}$, the variable bdofFlag set equal to FALSE, and the variable cIdx is set equal to 2 as inputs.

4. If MergeTriangleFlag[xCb][yCb] is equal to 1, the partition direction of merge triangle mode variable triangleDir is set equal to merge_triangle_split_dir[xCb][yCb].

a. The prediction samples inside the current luma coding block, $$predSamples_L[x_L][y_L] \text{ with } x_L = 0 \ldots cbWidth-1 \text{ and } y_L = 0 \ldots cbHeight-1,$$

are derived by invoking the weighted sample prediction process for triangle merge mode with the coding block width nCbW set equal to cbWidth, the coding block height nCbH set equal to cbHeight, the sample arrays $predSamplesLA_L$ and $predSamplesLB_L$, and the variables triangleDir, and cIdx equal to 0 as inputs.

b. The prediction samples inside the current chroma component Cb coding block, $$predSamples_{Cb}[x_C][y_C] \text{ with } x_C = 0 \ldots cbWidth/2-1 \text{ and } y_C = 0 \ldots cbHeight/2-1,$$

are derived by invoking the weighted sample prediction process for triangle merge mode with the coding block width nCbW set equal to cbWidth/2, the coding block height nCbH set equal to cbHeight/2, the sample arrays $predSamplesLA_{Cb}$ and $predSamplesLB_{Cb}$, and the variables triangleDir, and cIdx equal to 1 as inputs.

c. The prediction samples inside the current chroma component Cr coding block, $$predSamples_{Cr}[x_C][y_C] \text{ with } x_C = 0 \ldots cbWidth/2-1 \text{ and } y_C = 0 \ldots cbHeight/2-1,$$

are derived by invoking the weighted sample prediction process for triangle merge mode with the coding block width nCbW set equal to cbWidth/2, the coding block height nCbH set equal to cbHeight/2, the sample arrays $predSamplesLA_{Cr}$ and $predSamplesLB_{Cr}$, and the variables triangleDir, and cIdx equal to 2 as inputs.

d. The motion vector storing process for merge triangle mode is invoked with the luma coding block location (xCb, yCb), the luma coding block width cbWidth, the luma coding block height cbHeight, the partition direction triangleDir, the luma motion vectors mvA and mvB, the reference indices refIdxA and refIdxB, and the prediction list flags predListFlagA and predListFlagB as inputs.

5. If geo_flag[xCb][yCb] is equal to 1, the geometric partitioning related variables angleIdx and distanceIdx are set according to the value of geo_partitioning_idx[xCb][yCb] as specified in Table 1.

a. The sample weight derivation process for geometric partitioning merge mode is invoked. Input to the process are three ordered arrays sampleWeightL, sampleWeightC and motionWeight of size (cbWidth)×(cbHeight), (cbWidth/2)×(cbHeight/2) and (cbWidth/4)×(cbHeight/4) respectively, as well as the variables angleIdx, distanceIdx, cbWidth and cbHeight.

b. The prediction samples inside the current luma coding block, $$predSamplesL[xL][yL] \text{ with } xL = 0 \ldots cbWidth-1 \text{ and } yL = 0 \ldots cbHeight-1,$$

are derived by invoking the weighted sample prediction process for geometric partitioning merge mode with the coding block width nCbW set equal to cbWidth, the coding block height nCbH set equal to cbHeight, the sample arrays predSamplesLAL, predSamplesLBL, predWeightL and cIdx equal to 0 as inputs.

c. The prediction samples inside the current chroma component Cb coding block, $$predSamplesCb[xC][yC] \text{ with } xC = 0 \ldots cbWidth/2-1 \text{ and } yC = 0 \ldots cbHeight/2-1,$$

are derived by invoking the weighted sample prediction process for geometric partitioning merge mode with the coding block width nCbW set equal to cbWidth/2, the coding block height nCbH set equal to cbHeight/2, the sample arrays predSamplesLACb, predSamplesLBCb, predWeightC and cIdx equal to 1 as inputs.

d. The prediction samples inside the current chroma component Cr coding block, $$predSamplesCr[xC][yC] \text{ with } xC = 0 \ldots cbWidth/2-1 \text{ and } yC = 0 \ldots cbHeight/2-1,$$

are derived by invoking the weighted sample prediction process for geometric partitioning merge mode specified in clause 8.5.8.3 with the coding block width nCbW set equal to cbWidth/2, the coding block height nCbH set equal to cbHeight/2, the sample arrays predSamplesLACr, predSamplesLBCr, predWeightC and cIdx equal to 2 as inputs.

e. The motion vector storing process for geometric merge mode is invoked with the luma coding block location (xCb, yCb), the luma coding block width cbWidth, the luma coding block height cbHeight, the sample array motionWeight, the luma motion vectors mvA and mvB, the reference indices refIdxA and refIdxB, and the prediction list flags predListFlagA and predListFlagB as inputs.

Reference Picture Mapping Process for Triangle Merge Mode

Input to this process are:

a variable X representing a reference list being equal to 0 or 1, a reference index refIdxN.

Output of this process is:

a reference index refIdxTemp.

The variable refPicPoc is derived as follows:

$$refPicPoc = (X == 0) \; ? \; RelPicList[0][refIdxN] : RefPicList[1][refIdxN] \quad (8\text{-}878)$$

The reference picture list refPicListTemp is derived as follows:

$$refPicListTemp = (X == 0) \; ? \; RefPicList[1] : RefPicList[0] \quad (8\text{-}879)$$

The variable refIdxTemp is derived as follows:

The variable mapStop is set equal to FALSE.

For the variable $refIdx_m$ with $$m = 0 \ldots NumRefIdxActive[1] - 1$$

the following applies until mapStop is equal to FALSE:

$$refIdxTemp = (refPicListTemp[refIdx_m] == refPicPoc) \; ? \; refIdx_m : -1 \quad (8\text{-}880)$$

$$mapStop = (refIdxTemp \; != -1) \; ? \; \text{TRUE:FALSE} \quad (8\text{-}881)$$

Sample Weight Derivation Process for Geometric Partitioning Merge Mode

Inputs to this process are:

two variables nCbW and nCbH specifying the width and the height of the current coding block, two variables angleIdx and distanceIdx which specify the angle and distance lookup values of the current geometric partitioning mode, a (nCbW)×(nCbH) array $sampleWeight_L$, a (nCbW/2)×(nCbH/2) array $sampleWeight_C$, a (nCbW/4)×(nCbH/4) array motionWeight.

Output of this process are the same three arrays $sampleWeight_L$, $sampleWeight_C$ and motionWeight of per-sample weight values having a range from 0 . . . 8.

4. The luma blending weights stored in $sampleWeight_L$ for the current geometric partitioning mode are derived as follows:

The value of the following variables are set:

$$wIdx \text{ is set to } \log2(nCbW) - 3,$$

$$hIdx \text{ is set to } \log2(nCbH) - 3,$$

$$stepOffset \text{ is set to } 64,$$

the following variables are set according to the comparison of (wIdx>=hIdx):

$$whRatio = (wIdx >= hIdx) \; ? \; wIdx - hIdx : hIdx - wIdx \quad (8\text{-}882)$$

$$wIsLargerH = (wIdx >= hIdx) \; ? \; \text{true:false} \quad (8\text{-}883)$$

$$scaleStep = (wIdx >= hIdx) \; ? \; (1 << hIdx) : (1 << wIdx) \quad (8\text{-}884)$$

displacementX is set to angleIdx displacementY is set to (displacementX+8)% 32 angleN is set to:

$$angleN = angleIdx \text{ if } angleIdx >= 0 \;\&\&\; angleIdx <= 8,$$

$$angleN = 16 - angleIdx \text{ if } angleIdx > 8 \;\&\&\; angleIdx <= 16,$$

$$angleN = angleIdx - 16 \text{ if } angleIdx > 16 \;\&\&\; angleIdx <= 24,$$

$$angleN = 32 - angleIdx \text{ otherwise},$$

further, angleN is set to the following value, depending on wIsLargerH:

$$angleN = (wIsLargerH)\ ?\ 8 - angleN : angleN$$

stepDis is set according to the values of whRatio and angleN as specified in Table 2 and further, $$stepSize = stepDis + stepOffset$$

rho is set to the following value using the look-up table denoted as Dis, specified in Table 3:

$$rho = distanceIdx * stepSize * scaleStep + nCbW * Dis[displacementX] + nCbH * dis[displacementY]. \quad (8\text{-}885)$$

For each sample position $$x = 0 \ldots nCbW - 1 \text{ and } y = 0 \ldots nCbH - 1$$

the value of $sampleWeight_L[x][y]$ is derived in the following manner:

a distance distFromLine[x][y] is calculated using the look-up table denoted as Dis, specified in Table 3 as follows:

$$distFromLine[x][y] = ((x << 1) + 1) * Dis[displacementX] + ((y << 1) + 1)) * Dis[displacementY] - rho \quad (8\text{-}886)$$

A scaled distance distScaled is derived as:

$$distScaled = \min((\text{abs}(distFromLine[x][y]) + 8) >> 4, 14). \quad (8\text{-}887)$$

The value of $sampleWeight_L[x][y]$ is set according to the filter weight look-up table, denoted as GeoFilter specified in Table 4 as:

$$sampleWeight_L[x][y] = GeoFilter[distScaled] \text{ if } distFromLine <= 0$$

$$sampleWeight_L[x][y] = 8 - GeoFilter[distScaled] \text{ if } distFromLine > 0$$

5. The chroma weights stored in $sampleWeight_C$ for the current geometric partitioning mode are derived as follows:

For each sample position $$x = 0 \ldots (nCbW/2) - 1 \text{ and } y = 0 \ldots (nCbH/2) - 1$$

the value of $sampleWeight_C[x][y]$ is derived in the following manner:

$$sampleWeight_C[x][y] = sampleWeight_L[(x << 1)][(y << 1)]$$

6. The motion weights stored in the array motionWeight for the current geometric partitioning mode are derived as follows:

The following variables are set according to Table 5:

$$threshLower = -RhoMax[angleN]$$

$$threshUpper = RhoMax[angleN]$$

For each sample position $$x = 0 \ldots (nCbW/4) - 1 \text{ and } y = 0 \ldots (nCbH/4) - 1$$

the value of motionWeight[x][y] is derived in the following manner:

$$Cnt = distFromLine[x * 4 + 1][y * 4 + 1]$$

The value of the $motionWeight[x][y]$ is set to:

$$motionWeight[x][y] = 0 \text{ if } Cnt <= threshLower$$

$$motionWeight[x][y] = 1 \text{ if } Cnt >= threshUpper$$

$$motionWeight[x][y] = 2 \text{ otherwise}$$

Weighted Sample Prediction Process for Geometric Partitioning Merge Mode

Inputs to this process are:

two variables nCbW and nCbH specifying the width and the height of the current coding block, two (nCbW)×(nCbH) arrays predSamplesLA and predSamplesLB, an (nCbW)×(nCbH) array sampleWeight, a variable cIdx specifying colour component index.

Output of this process is the (nCbW)×(nCbH) array pbSamples of prediction sample values.

The variable bitDepth is derived as follows:

If cIdx is equal to 0, bitDepth is set equal to $BitDepth_Y$.

Otherwise, bitDepth is set equal to $BitDepth_C$.

Variables shift1 and offset1 are derived as follows:

The variable shift1 is set equal to Max(5, 17−bitDepth).

The variable offset1 is set equal to $$1 \ll (\text{shift1} - 1).$$

The prediction sample values are derived as follows:

$$pbSamples[x][y] = \text{Clip3}(0, (1 << \text{bitDepth}) - 1, (predSamplesLA[x][y] * sampleWeight[x][y] + predSamplesLB[x][y] * (8 - sampleWeight[x][y]) + \text{offset1}) >> shift1)$$

Motion Vector Storage for Geometric Partitioning Merge Mode

This process is invoked when decoding a coding unit with geo_flag[xCb][yCb] equal to 1.

Inputs to this process are:

a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, an array motionWeight of size (cbWidth/4)×(cbHeight/4) containing motion assignment indices, the luma motion vectors in 1/16 fractional-sample accuracy mvA and mvB, the reference indices refIdxA and refIdxB, the prediction list flags predListFlagA and predListFlagB.

The variables numSbX and numSbY specifying the number of 4×4 blocks in the current coding block in horizontal and vertical direction are set equal to $$numSbX = cbWidth \gg 2 \text{ and } numSbY = cbHeight \gg 2.$$

The variable minSb is set equal to min (numSbX, numSbY).

The variable refIdxTempA is derived by invoking the reference picture mapping process for triangle merge mode specified in clause 8.5.7.4 with X set equal to predListFlagA and refIdxN set equal to refIdxA as inputs.

The variable refIdxTempB is derived by invoking the reference picture mapping process for triangle merge mode specified in clause 8.5.7.4 with the X set equal to predListFlagB and refIdxN set equal to refIdxB as inputs.

For each 4×4 subblock at subblock index (xSbIdx, ySbIdx) with $$xSbIdx = 0 \ldots numSbX - 1, \text{ and } ySbIdx = 0 \ldots numSbY - 1,$$

the following applies:

If motionWeight[xSbIdx][ySbIdx] is equal to 0, the following applies:

$$predFlagL0 = (predListFlagA == 0)\ ?\ 1{:}0 \quad (8\text{-}888)$$

$$predFlagL1 = (predListFlagA == 0)\ ?\ 0{:}1 \quad (8\text{-}889)$$

$$refIdxL0 = (predListFlagA == 0)\ ?\ refIdxA{:} -1 \quad (8\text{-}890)$$

$$refIdxL1 = (predListFlagA == 0)\ ?\ -1{:}refIdxA \quad (8\text{-}891)$$

$$mvL0[0] = (predListFlagA == 0)\ ?\ mvA[0]{:}0 \quad (8\text{-}892)$$

$$mvL0[1](predListFlagA == 0)\ ?\ mvA[1]{:}0 \quad (8\text{-}893)$$

$$mvL1[0](predListFlagA == 0)\ ?\ 0{:}mvA[0] \quad (8\text{-}894)$$

$$mvL1[1](predListFlagA == 0)\ ?\ 0{:}mvA[1] \quad (8\text{-}895)$$

Otherwise, if motionWeight[xSbIdx][ySbIdx] is equal to 1, the following applies:

$$predFlagL0 = (predListFlagB == 0)\ ?\ 1{:}0 \quad (8\text{-}896)$$

$$predFlagL1 = (predListFlagB == 0)\ ?\ 0{:}1 \quad (8\text{-}897)$$

$$refIdxL0 = (predListFlagB == 0)\ ?\ refIdxB{:} -1 \quad (8\text{-}898)$$

$$refIdxL1 = (predListFlagB == 0)\ ?\ -1{:}refIdxB \quad (8\text{-}899)$$

$$mvL0[0] = (predListFlagB == 0)\ ?\ mvB[0]{:}0 \quad (8\text{-}900)$$

$$mvL0[1](predListFlagB == 0)\ ?\ mvB[1]{:}0 \quad (8\text{-}901)$$

$$mvL1[0](predListFlagB == 0)\ ?\ 0{:}mvB[0] \quad (8\text{-}902)$$

$$mvL1[1](predListFlagB == 0)\ ?\ 0{:}mvB[1] \quad (8\text{-}903)$$

Otherwise (motionWeight[xSbIdx][ySbIdx] is equal to 2), the following applies:

If predListFlagA+predListFlagB is equal to 1, $$predFlagL0 = 1 \quad (8\text{-}904)$$

$$predFlagL1 = 1 \quad (8\text{-}905)$$

$$refIdxL0 = (predListFlagA == 0)\ ?\ refIdxA{:}refIdxB \quad (8\text{-}906)$$

$$refIdxL1 = (predListFlagA == 0)\ ?\ refIdxB{:}refIdxA \quad (8\text{-}907)$$

$$mvL0[0] = (predListFlagA == 0)\ ?\ mvA[0]{:}mvB[0] \quad (8\text{-}908)$$

$$mvL0[1] = (predListFlagA == 0)\ ?\ mvA[1]{:}mvB[1] \quad (8\text{-}909)$$

$$mvL1[0] = (predListFlagA == 0)\ ?\ mvB[0]{:}mvA[0] \quad (8\text{-}910)$$

$$mvL1[1] = (predListFlagA == 0)\ ?\ mvB[1]{:}mvA[1] \quad (8\text{-}911)$$

If predListFlagA+predListFlagB is equal to 0, the following applies:

$$predFlagL0 = 1 \quad (8\text{-}912)$$

$$predFlagL1 = (refIdxTempA == -1\ \&\&\ refIdxTempB == -1)\ ?\ 0{:}1 \quad (8\text{-}913)$$

$$refIdxL0 = (refIdxTempB\ != -1)\ ?\ refIdxA{:}\ ((refIdxTempA\ != -1)\ ?\ refIdxB{:}refIdxA) \quad (8\text{-}914)$$

$$refIdxL1 = (refIdxTempB\ != -1)\ ?\ refIdxTempB{:}\ ((refIdxTempA\ != -1)\ ?\ refIdxTempA{:} -1) \quad (8\text{-}915)$$

$$mvL0[0] = (refIdxTempB\ != -1)\ ?\ mvA[0]{:}\ ((refIdxTempA\ != -1)\ ?\ mvB[0]{:}mvA[0]) \quad (8\text{-}916)$$

$$mvL0[1] = (refIdxTempB\ != -1)\ ?\ mvA[1]{:}\ ((refIdxTempA\ != -1)\ ?\ mvB[1]{:}mvA[1]) \quad (8\text{-}917)$$

$$mvL1[0] = (refIdxTempB\ != -1)\ ?\ mvB[0]{:}\ ((refIdxTempA\ != -1)\ ?\ mvA[0]{:}0) \quad (8\text{-}918)$$

$$mvL1[1] = (refIdxTempB\ != -1)\ ?\ mvB[1]{:}\ ((refIdxTempA\ != -1)\ ?\ mvA[1]{:}0) \quad (8\text{-}919)$$

If predListFlagA+predListFlagB is equal to 2, the following applies:

$$predFlagL0 = (refIdxTempA == -1 \ \&\& \ refIdxTempB == -1) \ ? \ 0:1 \quad (8\text{-}920)$$

$$predFlagL1 = 1 \quad (8\text{-}921)$$

$$refIdxL0 = (refIdxTempB \ != -1) \ ? \ refIdxB: \left((refIdxTempA \ != -1) \ ? \ refIdxTempA: -1\right) \quad (8\text{-}922)$$

$$refIdxL1 = (refIdxTempB \ != -1) \ ? \ refIdxA: \left((refIdxTempA \ != -1) \ ? \ refIdxB:refIdxA\right) \quad (8\text{-}923)$$

$$mvL0[0] = (refIdxTempB \ != -1) \ ? \ mvB[0]: \left((refIdxTempA \ != -1) \ ? \ mvA[0]:0\right) \quad (8\text{-}924)$$

$$mvL0[1] = (refIdxTempB \ != -1) \ ? \ mvB[1]: \left((refIdxTempA \ != -1) \ ? \ mvA[1]:0\right) \quad (8\text{-}925)$$

$$mvL1[0] = (refIdxTempB \ != -1) \ ? \ mvA[0]: \left((refIdxTempA \ != -1) \ ? \ mvB[0]:mvA[0]\right) \quad (8\text{-}926)$$

$$mvL1[1] = (refIdxTempB \ != -1) \ ? \ mvA[1]: \left((refIdxTempA \ != -1) \ ? \ mvB[1]:mvA[1]\right) \quad (8\text{-}927)$$

The following assignments are made for x=0 . . . 3 and y=0 . . . 3:

$$MvL0[(xSbIdx << 2) + x][(ySbIdx << 2) + y] = mvL0 \quad (8\text{-}928)$$

$$MvL1[(xSbIdx << 2) + x][(ySbIdx << 2) + y] = mvL1 \quad (8\text{-}929)$$

$$RefIdxL0[(xSbIdx << 2) + x][(ySbIdx << 2) + y] = refIdxL0 \quad (8\text{-}930)$$

$$RefIdxL1[(xSbIdx << 2) + x][(ySbIdx << 2) + y] = refIdxL1 \quad (8\text{-}931)$$

$$PredFlagL0[(xSbIdx << 2) + x][(ySbIdx << 2) + y] = predFlagL0 \quad (8\text{-}932)$$

$$PredFlagL1[(xSbIdx << 2) + x][(ySbIdx << 2) + y] = predFlagL1 \quad (8\text{-}933)$$

In an embodiment, Operation 6 of the "Sample weight derivation process for geometric partitioning merge mode" can be implemented as follows:

6. The motion weights stored in the array motionWeight for the current geometric partitioning mode are derived as follows:

The following variables are set according to Table 5:

$$threshLower = -RhoMax[angleN]$$

$$threshUpper = RhoMax[angleN]$$

For each sample position $$x = 0 \ \dots \ (nCbW/4) - 1 \text{ and } y = 0 \ \dots \ (nCbH/4) - 1$$

the value of motionWeight[x][y] is derived in the following manner:

$$Cnt = ((x << 4) + 3) * Dis[displacementX] + ((y << 4) + 3)) * Dis[displacementY] - rho << 1$$

The value of motionWeight[x][y] is set to:

$$motionWeight[x][y] = 0 \text{ if } Cnt <= threshLower$$

$$motionWeight[x][y] = 1 \text{ if } Cnt >= threshUpper$$

$$motionWeight[x][y] = 2 \text{ otherwise}$$

In the above exemplary implementation of the operation 6 of "Sample weight derivation process for geometric partitioning merge mode", the equation $$\text{“}Cnt = ((x \ll 4) + 3) * Dis[displacementX] + ((y \ll 4) + 3)) * Dis[displacementY] - rho \ll 1\text{”}$$

corresponds to the calculation of distance between the center of gravity of the set of samples and the line. The set of samples in this example comprise 16 samples that have the following coordinates:

$$(x*4, y*4), (x*4+1, y*4), (x*4+2, y*4), (x*4+3, y*4), (x*4, y*4+1), (x*4+1, y*4+1), (x*4+2, y*4+1), (x*4+3, y*4+1), (x*4, y*4+2), (x*4+1, y*4+2), (x*4+2, y*4+2), (x*4+3, y*4+2), (x*4, y*4+3), (x*4+1, y*4+3), (x*4+2, y*4+3), (x*4+3, y*4+3).$$

The coordinates of the center of gravity is $$(x*4+1.5, y*4+1.5).$$

In the equation above all of the additive terms of the equation are multiplied by 2 in order to make the coordinate offsets 1.5 integer (hence 3 in this example), since integer arithmetic is a desired implementation feature.

Figure 21:
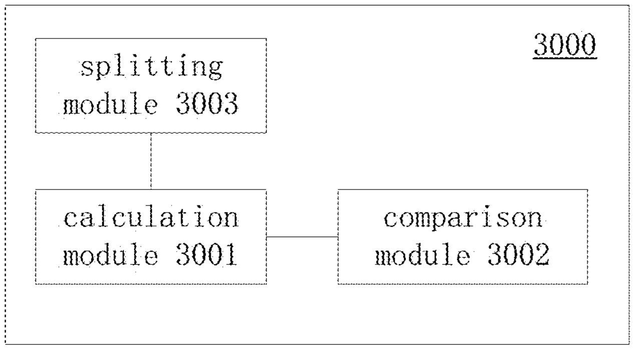
FIG. 21 a block diagram illustrating an example of a motion information storage apparatus.

In a fifth embodiment, an apparatus for storing motion information, as shown in FIG. 21, is following:

A motion information storing apparatus (3000), wherein a current block consists of a first subblock and a second subblock, the first subblock and the second subblock are separated by a common boundary, the first subblock corresponds to first motion information and the second subblock corresponds to second motion information, the apparatus (3000) comprising: a calculation module (3001), configured to determine a distance between a sample set in the current block and the common boundary; and a comparison module (3002), configured to compare the distance with a threshold to determine whether third motion information is stored for the sample set, wherein the third motion information is derived by the first motion information and the second motion information.

In an embodiment, wherein the comparison module (3002) is configured to:

determine the third motion information is stored for the sample set in the event that an absolute value of the distance is smaller than or equal to the threshold.

In an embodiment, wherein in the event that the absolute value of the distance is larger than the threshold, the comparison module (3002) is further configured to: determine the first motion information is stored for the sample set in the event that the distance is positive; or, determine the second motion information is stored for the sample set in the event that the distance is negative.

In an embodiment, wherein the threshold is predetermined.

In an embodiment, wherein the threshold is based on a geometric relationship between the common boundary and a horizontal direction or a vertical direction.

In an embodiment, wherein the threshold is based on an angle between a perpendicular direction of the common boundary and the horizontal direction or the vertical direction.

In an embodiment, wherein the threshold is based on a width and/or a height of the current block.

In an embodiment, wherein the common boundary is determined by an angular parameter and a distance parameter, the calculation module (3001) is further configured to: determine the angular parameter and the distance parameter.

In an embodiment, wherein in a decoder, the calculation module (3001) is further configured to: parse the angular parameter and the distance parameter from a bitstream; or, parse an indicator from the bitstream, and obtain the angular parameter and the distance parameter based on the indicator.

In an embodiment, wherein the calculation module (3001) is further configured to: determine a first calculation parameter based on the angular parameter; calculate a temp angular parameter based on the angular parameter; determine a second calculation parameter based on the temp angular parameter; and calculate a third calculation parameter based on the angular parameter and the distance parameter.

In an embodiment, wherein the first calculation parameter is determined by checking a preset lookup table according to the angular parameter and the second calculation parameter is determined by checking the lookup table according to the temp angular parameter, and wherein the first calculation parameter and the second calculation parameter are a cosine value and a sine value of a same angle respectively.

In an embodiment, wherein the distance is calculated by the following:

$$distFromLine = (x + K) * P1 + (y + K) * P2 - P3$$

wherein P1, P2 and P3 are the first calculation parameter, the second calculation parameter and the third calculation parameter respectively, distFromLine represents the distance, K is a non-negative integer, x represents a horizontal coordinate of a target position in the sample set, y represents a vertical coordinate of the target position in a rectangular coordinate system, where a position of the top-left sample of the current block is set as a coordinate origin, right direction is set as the positive horizontal direction and down direction is set as the positive vertical direction.

In an embodiment, wherein K equals to 1.

In an embodiment, wherein the target position is predetermined in the sample set.

In an embodiment, wherein the predetermined position is a top-left position of the sample set, or a center position of the sample set.

In an embodiment, wherein the sample precision of the distance is higher than the integer sample;

correspondingly, the distance is calculated by the following:

$$distFromLine = ((x << N) + K) * P1 + ((y << N) + K) * P2 - P3$$

where 2N represents a reciprocal of the sample precision of the distance.

In an embodiment, wherein N equals to 1.

In an embodiment, wherein the sample set is a luma sample set of the current block.

In an embodiment, wherein the apparatus (3000) further comprises a splitting module (3003), configured to: split the current block into multiple sample sets, wherein each of the multiple sample sets has a same size as the sample set; or set the current block as the sample set.

In an embodiment, wherein the sample set is a 4×4 sample array.

In an embodiment, wherein each of the multiple sample sets corresponds to each motion information storage unit, the motion information storage unit is used to store one of the first motion information, the second motion information and the third motion information.

In an embodiment, wherein the first subblock and the second subblock are triangle partition, trapezoid partition, or asymmetric rectangular partition.

In an embodiment, wherein the first motion information comprises motion information based on a first reference picture list, the second motion information comprises motion information based on a second reference picture list, and wherein the third motion information comprises the first motion information and the second motion information.

In a sixth embodiment, an apparatus for decoding a video stream includes a processor and a memory, wherein the memory is storing instructions that cause the processor to perform the method according to any implementation of the third embodiment.

In a seventh embodiment, an apparatus for encoding a video stream includes a processor and a memory, wherein the memory is storing instructions that cause the processor to perform the method according to any implementation of the third embodiment.

In an eighth embodiment, a computer-readable storage medium having stored thereon instructions that when executed cause one or more processors configured to code video data, wherein the instructions cause the one or more processors to perform a method according to any implementation of the third embodiment.

In a ninth embodiment, a computer program comprising program code for performing the method according to any implementation of the third embodiment when executed on a computer.

Following is an explanation of the applications of the encoding method as well as the decoding method as shown in the above-mentioned embodiments, and a system using them.

Figure 22:
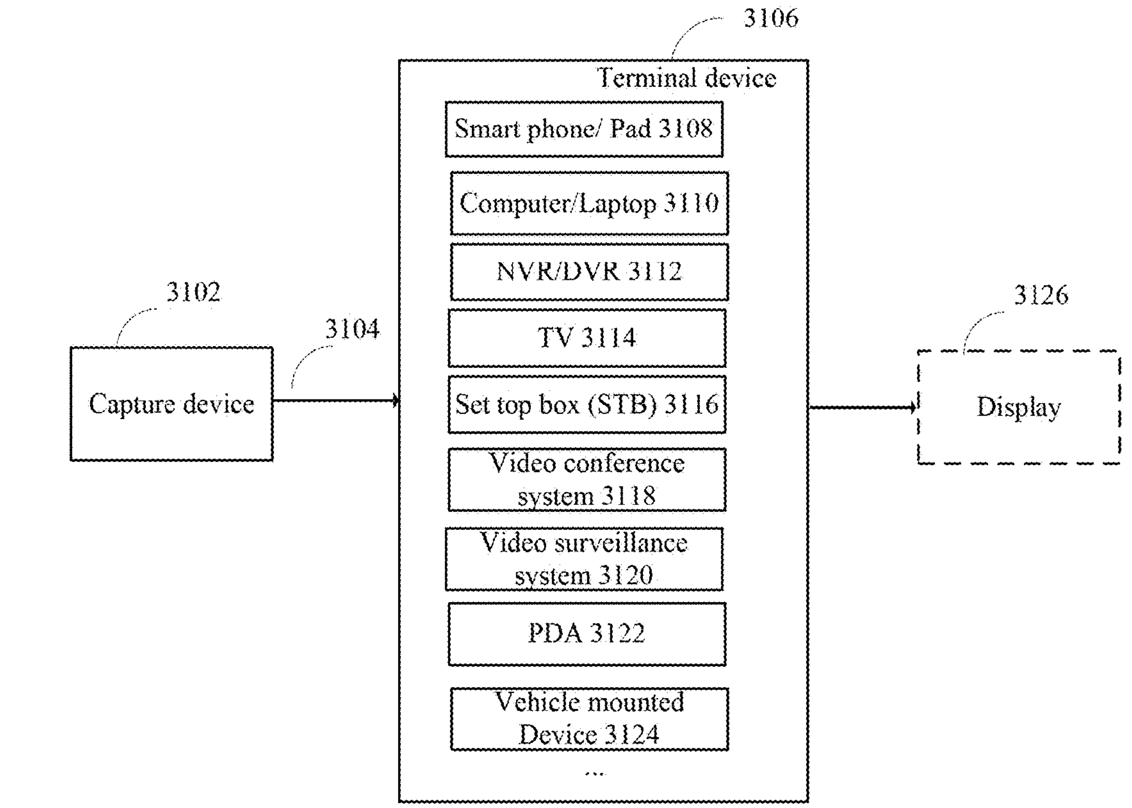
FIG. 22 is a block diagram showing an example structure of a content supply system 3100 which realizes a content delivery service.

FIG. 22 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 23:
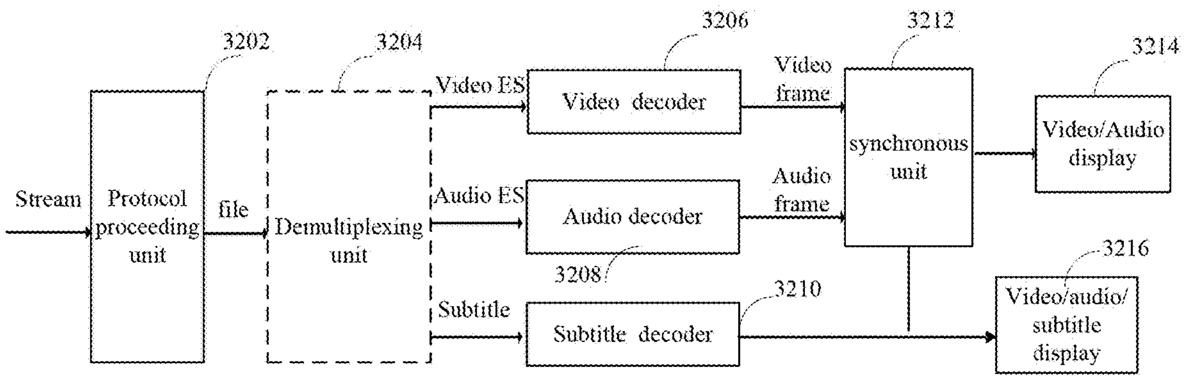
FIG. 23 is a block diagram showing a structure of an example of a terminal device.

FIG. 23 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 23) before feeding it to the synchronous unit 3212. Similarly, the audio frame may store in a buffer (not shown in FIG. 23) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present application is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:

| | |
|---|---|
| + | Addition |
| − | Subtraction (as a two-argument operator) or negation (as a unary prefix operator) |
| * | Multiplication, including matrix multiplication |
| $x^y$ | Exponentiation. Specifies x to the power of y. In other contexts, such notation is used for superscripting not intended for interpretation as exponentiation. |
| / | Integer division with truncation of the result toward zero. For example, 7/4 and −7/−4 are truncated to 1 and −7/4 and 7/−4 are truncated to −1. |

-continued

| | |
|---|---|
| ÷ | Used to denote division in mathematical equations where no truncation or rounding is intended. |
| $\frac{x}{y}$ | Used to denote division in mathematical equations where no truncation or rounding is intended. |
| $\sum_{i=x}^{y} f(i)$ | The summation of f(i) with i taking all integer values from x up to and including y. |
| x % y | Modulus. Remainder of x divided by y, defined only for integers x and y with x >= 0 and y > 0. |

Logical Operators

The following logical operators are defined as follows:

| | |
|---|---|
| x && y | Boolean logical "and" of x and y |
| x \|\| y | Boolean logical "or" of x and y |
| ! | Boolean logical "not" |
| x ? y : z | If x is TRUE or not equal to 0, evaluates to the value of y; otherwise, evaluates to the value of z. |

Relational Operators

The following relational operators are defined as follows:

| | |
|---|---|
| > | Greater than |
| >= | Greater than or equal to |
| < | Less than |
| <= | Less than or equal to |
| == | Equal to |
| != | Not equal to |

When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:

| | |
|---|---|
| & | Bit-wise "and". When operating on integer arguments, operates on a two's complement representation of the integer value. When operating on a binary argument that contains fewer bits than another argument, the shorter argument is extended by adding more significant bits equal to 0. |
| \| | Bit-wise "or". When operating on integer arguments, operates on a two's complement representation of the integer value. When operating on a binary argument that contains fewer bits than another argument, the shorter argument is extended by adding more significant bits equal to 0. |
| ^ | Bit-wise "exclusive or". When operating on integer arguments, operates on a two's complement representation of the integer value. When operating on a binary argument that contains fewer bits than another argument, the shorter argument is extended by adding more significant bits equal to 0. |
| x >> y | Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation. |
| x << y | Arithmetic left shift of a two's complement integer representation of x by y binary digits. This function is defined only for non-negative integer values of y. Bits shifted into the least significant bits (LSBs) as a result of the left shift have a value equal to 0. |

Assignment Operators

The following arithmetic operators are defined as follows:

| | |
|---|---|
| = | Assignment operator |
| ++ | Increment, i.e., x++ is equivalent to x = x + 1; when used in an array index, evaluates to the value of the variable prior to the increment operation. |
| — | Decrement, i.e., x— is equivalent to x = x − 1; when used in an array index, evaluates to the value of the variable prior to the decrement operation. |
| += | Increment by amount specified, i.e., x += 3 is equivalent to x = x + 3, and x += (−3) is equivalent to x = x + (−3). |
| −= | Decrement by amount specified, i.e., x −= 3 is equivalent to x = x − 3, and X −= (−3) is equivalent to x = x − (−3). |

Range Notation

The following notation is used to specify a range of values:

| | |
|---|---|
| x = y . . . z | x takes on integer values starting from y to z, inclusive, with x, y, and z being integer numbers and z being greater than y. |

Mathematical Functions

The following mathematical functions are defined:

$$\mathrm{Abs}(x) = \begin{cases} x; & x >= 0 \\ -x; & x < 0 \end{cases}$$

Asin(x) the trigonometric inverse sine function, operating on an argument x that is in the range of −1.0 to 1.0, inclusive, with an output value in the range of $$-\pi \div 2 \text{ to } \pi \div 2,$$

inclusive, in units of radians

Atan(x) the trigonometric inverse tangent function, operating on an argument x, with an output value in the range of $$-\pi \div 2 \text{ to } \pi \div 2,$$

inclusive, in units of radians $$\text{Atan2}(y, x) = \begin{cases} \text{Atan}\left(\frac{y}{x}\right); & x > 0 \\ \text{Atan}\left(\frac{y}{x}\right) + \pi; & x < 0 \ \&\& \ y >= 0 \\ \text{Atan}\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil(x) the smallest integer greater than or equal to x.

$$\text{Clip1}_Y(x) = \text{Clip3}(0, \ (1 << BitDepth_Y) - 1, \ x)$$

$$\text{Clip1}_C(x) = \text{Clip3}(0, \ (1 << BitDepth_C) - 1, \ x)$$

$$\text{Clip3}(x, y, z) = \begin{cases} x; & z < x \\ y; & z > y \\ z; & \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln(x) the natural logarithm of x (the base-e logarithm, where e is the natural logarithm base constant 2.718 281 828 . . . ).

Log2(x) the base-2 logarithm of x.

Log10(x) the base-10 logarithm of x.

$$\text{Min}(x, y) = \begin{cases} x; & x <= y \\ y; & x > y \end{cases}$$

$$\text{Max}(x, y) = \begin{cases} x; & x >= y \\ y; & x < y \end{cases}$$

$$\text{Round}(x) = \text{Sign}(x) * \text{Floor}(\text{Abs}(x) + 0.5)$$

$$\text{Sign}(x) = \begin{cases} 1; & x > 0 \\ 0; & x == 0 \\ -1; & x < 0 \end{cases}$$

Sin(x) the trigonometric sine function operating on an argument x in units of radians $$Sqrt(x) = \sqrt{x}$$

$$\text{Swap}(x, y) = (y, x)$$

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |
| "$x * y$", "$x / y$", "$x \div y$", "$\frac{x}{y}$", "$x \% y$" |
| "$x + y$", "$x - y$" (as a two-argument operator), "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x..y" |
| "x = y", "x += y", "x −= y" |

Text Description of Logical Operations

In the text, a statement of logical operations as would be described mathematically in the following form:

if(condition 0)
statement 0
else if(condition 1)
statement 1
. . .
else/* informative remark on remaining condition */
statement n may be described in the following manner:

. . . as follows/ . . . the following applies:
If condition 0, statement 0
Otherwise, if condition 1, statement 1
. . .
Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if(condition 0a && condition 0b)
statement 0
else if(condition 1a||condition 1b)
statement 1
. . .
else
statement n may be described in the following manner:

. . . as follows/ . . . the following applies:

If all of the following conditions are true, statement 0:
condition 0a
condition 0b
Otherwise, if one or more of the following conditions are true, statement 1:
condition 1a
condition 1b
. . .
Otherwise, statement n In the text, a statement of logical operations as would be described mathematically in the following form:

if(condition 0)
statement 0
if(condition 1)
statement 1 may be described in the following manner:

When condition 0, statement 0
When condition 1, statement 1.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A decoding method, comprising:

receiving a bitstream, wherein the bitstream comprises coded data of a current block and an indicator; wherein the current block is separated by a common boundary into a first subblock and a second subblock, the first subblock corresponds to a first prediction value and the second subblock corresponds to a second prediction value, the common boundary is a split line of a geometric partition mode;

parsing the indicator from the bitstream;

obtaining an angular parameter and a distance parameter based on the indicator; the angular parameter specifying an angle index of the geometric partition mode, and the distance parameter specifying a distance index of the geometric partition mode;

determining a distance between a sample set in the current block and the common boundary based on the angular parameter and the distance parameter by checking a preset lookup table; and obtaining a first weighting factor according to the distance;

obtaining a second weighting factor according to the first weighting factor;

obtaining a combination prediction value for the current block by using the first prediction value, the second prediction value, the first weighting factor and the second weighting factor; and comparing the distance with a threshold to determine whether to store third motion information for the sample set, wherein the first subblock corresponds to first motion information and the second subblock corresponds to second motion information, the third motion information is derived by the first motion information and the second motion information.

2. The method of claim 1, wherein the angular parameter is angleIdx, the distance parameter is distanceIdx; wherein the determining the distance based on the angular parameter and the distance parameter by checking a preset lookup table, comprises:

calculating the distance by using the following equation:

$$distFromLine = ((x << N) + K) * P1 + ((y << N) + K) * P2 - P3;$$

wherein the distFromLine represents the distance, K is a non-negative integer, N=1, P1, P2 and P3 are a first calculation parameter, a second calculation parameter and a third calculation parameter respectively, wherein the first calculation parameter is determined by checking the preset lookup table according to the angleIdx and the second calculation parameter is determined by checking the lookup table according to (angleIdx+8)%32, the third calculation parameter is determined based on the angleIdx and the distanceIdx.

3. The method of claim 1, wherein the first weighting factor is calculated by using the following equation:

$$sampleWeight1 = \text{Clip3}(0, 8, f(\text{sample\_dist}))$$

wherein the sampleWeight1 represents the first weighting factor, the sample_dist represents the distance, f(sample_dist) represents a function with sample_dist as input.

4. The method of claim 1, wherein the obtaining the second weighting factor according to the first weighting factor comprises:

calculating the second weighting factor according to the following formula:

$$sampleWeight2 = T - sampleWeight1;$$

wherein the sampleWeight1 represents the first weighting factor, the sampleWeight2 represents the second weighting factor, T is a predefined constant.

5. The method of claim 4, wherein T is equal to 8.

6. The method of claim 1, wherein comparing the distance with the threshold to determine whether to store the third motion information for the sample set, comprises:

in the event that an absolute value of the distance is smaller than or equal to the threshold, determining to store the third motion information for the sample set;

in the event that the absolute value of the distance is larger than the threshold, the method further comprising:

determining to store the first motion information for the sample set in the event that the distance is positive; or, determining to store the second motion information for the sample set in the event that the distance is negative.

7. An encoding method, comprising:

encoding a current block and an indicator into a bitstream; wherein the current block is separated by a common boundary into a first subblock and a second subblock, the first subblock corresponds to a first prediction value and the second subblock corresponds to a second prediction value, the common boundary is a split line of a geometric partition mode;

obtaining an angular parameter and a distance parameter based on the indicator; the angular parameter specifying an angle index of the geometric partition mode, and the distance parameter specifying a distance index of the geometric partition mode;

determining a distance between a sample set in the current block and the common boundary based on the angular parameter and the distance parameter by checking a preset lookup table; and obtaining a first weighting factor according to the distance;

obtaining a second weighting factor according to the first weighting factor;

obtaining a combination prediction value for the current block by using the first prediction value, the second prediction value, the first weighting factor and the second weighting factor; and comparing the distance with a threshold to determine whether to store third motion information for the sample set, wherein the first subblock corresponds to first motion information and the second subblock corresponds to second motion information, the third motion information is derived by the first motion information and the second motion information.

8. The method of claim 7, wherein the angular parameter is angleIdx, the distance parameter is distanceIdx; wherein the method further comprises:

calculating the distance by using the following equation:

$$distFromLine = ((x << N) + K) * P1 + ((y << N) + K) * P2 - P3;$$

wherein the distFromLine represents the distance, K is a non-negative integer, N=1, P1, P2 and P3 are a first calculation parameter, a second calculation parameter and a third calculation parameter respectively, wherein the first calculation parameter is determined by checking the preset lookup table according to the angleIdx and the second calculation parameter is determined by checking the lookup table according to (angleIdx+8)%32, the third calculation parameter is determined based on the angleIdx and the distanceIdx.

9. The method of claim 7, wherein the first weighting factor is calculated by using the following equation:

$$sampleWeight1 = \text{Clip3}(0, 8, f(\text{sample\_dist}))$$

wherein the sampleWeight1 represents the first weighting factor, the sample_dist represents the distance, f(sample_dist) represents a function with sample_dist as input.

10. The method of claim 7, further comprising calculating the second weighting factor according to the following formula:

$$sampleWeight2 = T - sampleWeight1;$$

wherein the sampleWeight1 represents the first weighting factor, the sampleWeight2 represents the second weighting factor, T is a predefined constant.

11. The method of claim 10, wherein T is equal to 8.

12. The method of claim 7, further comprising:

in the event that an absolute value of the distance is smaller than or equal to the threshold, determining to store the third motion information for the sample set;

in the event that the absolute value of the distance is larger than the threshold:

determining to store the first motion information for the sample set in the event that the distance is positive; or, determining to store the second motion information for the sample set in the event that the distance is negative.

13. A non-transitory computer-readable medium having stored thereon a bitstream and one or more instructions executable by at least one processor to perform operations of encoding or decoding of the bitstream, the operations including:

encoding a current block and an indicator into the bitstream, wherein the current block is separated by a common boundary into a first subblock and a second subblock, the first subblock corresponds to a first prediction value and the second subblock corresponds to a second prediction value, the common boundary is a split line of a geometric partition mode;

wherein the indicator is used to obtain an angular parameter and a distance parameter, the angular parameter specifying an angle index of the geometric partition mode, and the distance parameter specifying a distance index of the geometric partition mode;

determining a distance between a sample set in the current block and the common boundary based on the angular parameter and the distance parameter by checking a preset lookup table; and obtaining a first weighting factor according to the distance;

obtaining a second weighting factor according to the first weighting factor;

obtaining a combination prediction value for the current block by using the first prediction value, the second prediction value, the first weighting factor and the second weighting factor; and comparing the distance with a threshold to determine whether to store third motion information for the sample set, wherein the first subblock corresponds to first motion information and the second subblock corresponds to second motion information, the third motion information is derived by the first motion information and the second motion information.

14. The computer-readable medium of claim 13, wherein the first weighting factor is calculated by using the following equation:

$$sampleWeight1 = \text{Clip3}(0, 8, f(\text{sample\_dist}))$$

wherein the sampleWeight1 represents the first weighting factor, the sample_dist represents the distance, f(sample_dist) represents a function with sample_dist as input.

15. The computer-readable medium of claim 13, wherein the obtaining the second weighting factor according to the first weighting factor comprises:

calculating the second weighting factor according to the following formula:

$$sampleWeight2 = T - sampleWeight1;$$

wherein the sampleWeight1 represents the first weighting factor, the sampleWeight2 represents the second weighting factor, T is a predefined constant.

16. The computer-readable medium of claim 15, wherein T is equal to 8.

17. The computer-readable medium of claim 13, wherein the angular parameter is angleIdx, the distance parameter is distanceIdx; wherein the determining the distance based on the angular parameter and the distance parameter by checking a preset lookup table, comprises:

calculating the distance by using the following equation:

$$distFromLine = ((x \ll N) + K) * P1 + ((y \ll N) + K) * P2 - P3;$$

wherein the distFromLine represents the distance, K is a non-negative integer, N=1, P1, P2 and P3 are a first calculation parameter, a second calculation parameter and a third calculation parameter respectively, wherein the first calculation parameter is determined by checking the preset lookup table according to the angleIdx and the second calculation parameter is determined by checking the lookup table according to (angleIdx+8)% 32, the third calculation parameter is determined based on the angleIdx and the distanceIdx.

* * * * *